United States Patent
Jogerst et al.

(10) Patent No.: US 11,935,661 B2
(45) Date of Patent: Mar. 19, 2024

(54) CERMET FUEL ELEMENT AND FABRICATION AND APPLICATIONS THEREOF, INCLUDING IN THERMAL PROPULSION REACTOR

(71) Applicant: BWXT Nuclear Energy, Inc., Charlotte, NC (US)

(72) Inventors: James D. Jogerst, Forest, VA (US); Eric A. Barringer, Rustburg, VA (US)

(73) Assignee: BWXT Nuclear Energy, Inc., Charlotte, NC (US)

( * ) Notice: Subject to any disclaimer, the term of this patent is extended or adjusted under 35 U.S.C. 154(b) by 0 days.

(21) Appl. No.: 17/399,859

(22) Filed: Aug. 11, 2021

(65) Prior Publication Data

US 2022/0115151 A1 Apr. 14, 2022

Related U.S. Application Data

(60) Provisional application No. 63/090,378, filed on Oct. 12, 2020.

(51) Int. Cl.
*G21C 21/02* (2006.01)
*G21C 3/64* (2006.01)
(Continued)

(52) U.S. Cl.
CPC .............. *G21C 21/02* (2013.01); *G21C 3/64* (2013.01); *B22F 3/15* (2013.01); *B22F 2301/20* (2013.01);
(Continued)

(58) Field of Classification Search
CPC ........ G21C 3/042; G21C 3/044; G21C 3/626; G21C 3/64; G21C 21/02; B64G 1/408;
(Continued)

(56) References Cited

U.S. PATENT DOCUMENTS 2,499,977 A * 3/1950 Scott ...................... H01J 19/00
428/116
3,053,743 A 9/1962 Cain, Jr.
(Continued)

FOREIGN PATENT DOCUMENTS

CN 102851070 B 10/2014

OTHER PUBLICATIONS

Hickman, Robert, Jeramie Broadway, and Omar Mireles. "Fabrication and testing of CERMET fuel materials for nuclear thermal propulsion." 48th AIAA/ASME/SAE/ASEE Joint Propulsion Conference & Exhibit. 2012. (Year: 2012).*
(Continued)

*Primary Examiner* — Jack W Keith
*Assistant Examiner* — Jinney Kil
(74) *Attorney, Agent, or Firm* — Morgan, Lewis & Bockius LLP

(57) ABSTRACT

CERMET fuel element includes a fuel meat of consolidated ceramic fuel particles (preferably refractory-metal coated HALEU fuel kernels) and an array of axially-oriented coolant flow channels. Formation and lateral positions of coolant flow channels in the fuel meat are controlled during manufacturing by spacer structures that include ceramic fuel particles. In one embodiment, a coating on a sacrificial rod (the rod being subsequently removed) forms the coolant channel and the spacer structures are affixed to the coating; in a second embodiment, a metal tube forms the coolant channel and the spacer structures are affixed to the metal tube. The spacer structures laterally position the coolant channels in spaced-apart relation and are consolidated with the ceramic fuel particles to form CERMET fuel meat of a fuel element, which are subsequently incorporated into fuel assemblies that are distributively arranged in a moderator (Continued)

block within a nuclear fission reactor, in particular for propulsion.

18 Claims, 15 Drawing Sheets

(51) Int. Cl.
| | |
|---|---|
| G21C 5/12 | (2006.01) |
| G21C 5/02 | (2006.01) |
| B22F 3/15 | (2006.01) |
| C22C 1/05 | (2023.01) |
| B64G 1/40 | (2006.01) |
| F02K 7/02 | (2006.01) |

(52) U.S. Cl.
CPC ............ *B64G 1/408* (2013.01); *C22C 1/05* (2013.01); *F02K 7/02* (2013.01); *G21C 5/02* (2013.01); *G21C 5/12* (2013.01)

(58) Field of Classification Search
CPC ........... B64G 1/422; B22F 2003/1042; B22F 3/1121; B22F 3/1137; B22F 3/1291; B22F 2005/103; B22F 10/40; B22F 10/47; B28B 7/16; B28B 7/18; B28B 7/34; B28B 7/342; B28B 23/0006; B28B 23/0056; B28B 23/0068; B28B 23/02; B28B 23/022; B28B 23/024; B29C 33/126; B29C 2043/3602; B29C 2043/3634; B29C 2043/6338; B29C 2045/14131; B29C 2045/1477; B29C 45/14836
USPC ....... 376/455, 456; 419/5, 49; 264/604, 629, 264/667, 671, 673
See application file for complete search history.

(56) References Cited

U.S. PATENT DOCUMENTS

| | | | | |
|---|---|---|---|---|
| 3,345,267 | A * | 10/1967 | Nazzer | G21C 3/336 976/DIG. 69 |
| 3,352,003 | A * | 11/1967 | Murtha | G21C 3/336 29/523 |
| 3,499,066 | A * | 3/1970 | Murray | B22F 7/08 425/405.2 |
| 3,936,349 | A * | 2/1976 | Prescott | G21C 3/12 376/454 |
| 4,492,669 | A * | 1/1985 | Gould | G02B 7/182 249/177 |
| H1753 | H | 10/1998 | Warren et al. | |
| 2017/0263345 | A1* | 9/2017 | Venneri | B64G 1/408 |
| 2020/0118697 | A1* | 4/2020 | Yoon | G21C 3/07 |
| 2020/0156282 | A1* | 5/2020 | Terrani | B33Y 70/00 |
| 2021/0394265 | A1* | 12/2021 | Rushkin | B22F 1/10 |

OTHER PUBLICATIONS

Mireles, O., J. Broadway, and R. Hickman. Design Evolution of Hot Isostatic Press Cans for NTP Cermet Fuel Element Fabrication. No. M14-3383. 2014. (Year: 2014).*

Gripshover, P. J., and J. H. Peterson. Development of Uranium Dioxide-Tungsten Cermet fuel Specimens for Thermionic Applications. No. NASA CR 1059. National Aeronautics and Space Administration, 1968. (Year: 1968).*
Haertling, C., and R. J. Hanrahan Jr. "Literature review of thermal and radiation performance parameters for high-temperature, uranium dioxide fueled cermet materials." Journal of nuclear materials 366.3 (2007): 317-335. (Year: 2007).*
Houts, Michael G., et al. A Nuclear Cryogenic Propulsion Stage for Near-Term Space Missions. No. M13-2984. 2013. (Year: 2013).*
Burkes, Douglas E., et al. "An Overview of Current and Past W-UO [2] CERMET Fuel Fabrication Technology." (2007). (Year: 2007).*
Tucker, Dennis S. "Cermets for use in nuclear thermal propulsion." Advances in Composite Materials Development (2019). (Year: 2019).*
Hickman, Robert, Binayak Panda, and Sandeep Shah. "Fabrication of high temperature cermet materials for nuclear thermal propulsion." Joint Army Navy Nasa Air Force (JANNAF) Propulsion Meeting (JPM) and 2nd Liquid Propulsiod/Ist Spacecraft Propulsion Subcommittee Meeting. 2005. (Year: 2005).*
Fittje, James E., Stanely Borowoski, and Bruce G. Schnitzler. "Revised point of departure design options for nuclear thermal propulsion." AIAA SPACE 2015 Conference and Exposition. 2015. (Year: 2015).*
Broadway, Jeramie, Robert Hickman, and Omar Mireles. "Status on the Development of CERMET Fuels For A Nuclear Cryogenic Propulsion Stage (NCPS)." AIAA/ASME/SAE/ASEE Joint Propulsion Conference. No. M13-2790. 2013. (Year: 2013).*
Argonne National Laboratory. "Nuclear Rocket Program Quarterly Progress Report." ANL-7150. 1965 (Year: 1965).*
Westerman, Kurt O., et al. "Babcock and Wilcox assessment of the Pratt and Whitney XNR2000." NASA. Lewis Research Center, Nuclear Propulsion Technical Interchange Meeting, vol. 1. 1993. (Year: 1993).*
International Search Report and Written Opinion dated Nov. 26, 2021 in International Application No. PCT/US21/45635.
Borowski et al., "Nuclear Thermal Propulsion (NTP): A Proven Growth Technology for Human NEO/Mars Exploration Missions", 2012 IEEE Aerospace Conference (Big Sky, MT), (Mar. 3, 2021), 20 pages.
"710 High-Temperature Gas Reactor Program Summary Report", vol. III, Fuel Element Development, General Electric, Report No. GEMP-600 (vol. 3), 1967.
ANL Report, "Nuclear Rocket Program Terminal Report", Argonne National Laboratory (ANL-7236), Jun. 30, 1966.
Saunders et al., "Feasibility Study of a Tungsten Water-Moderated Nuclear Rocket, II Fueled Materials", NASA TM X-1421. 1968.
Haertling, "Literature review of thermal and radiation performance parameters for high-temperature, uranium dioxide fueled cermet materials", Journal of Nuclear Materials, 366(3), 317-335 (Jul. 2007).
Bhattacharyya, "An Assessment of Fuels for Nuclear Thermal Propulsion", Argonne National Laboratory, ANL/TD/TN01-22 (2001).
Collins et al., "Evaluation of Uranium Mononitride Cermet Fuel", General Electric, Report No. GEMP-659, 1968.
Takkunen et al. "Fabrication of cermets of Uranium Nitride and Tungsten or Molybdenum from Mixed Powders and from Coated Particles", Report No. NASA TN D-5136, NASA Lewis Research Center, Cleveland, OH (Apr. 1969).
Kardoulaki et al., "Synthesis, thermal conductivity, and hydrogen compatibility of a high melt point solid solution uranium carbide, (U0.2Zr0.8)C", Nuclear Materials and Energy 33 (2022) 101290.

\* cited by examiner

CERMET FUEL ELEMENT AND FABRICATION AND APPLICATIONS THEREOF, INCLUDING IN THERMAL PROPULSION REACTOR

RELATED APPLICATION DATA

This application is based on and claims priority under 35 U.S.C. § 119 to U.S. Provisional Application No. 63/090,378, filed Oct. 12, 2020, the entire contents of which are incorporated herein by reference.

STATEMENT REGARDING FEDERALLY SPONSORED RESEARCH OR DEVELOPMENT

The invention described herein was made in the performance of work under NASA Prime Contract 80MSFC17C0006 and is subject to the provisions of section 2035 of the National Aeronautics and Space Act (51 U.S.C. § 20135). The Government has certain rights in this invention.

TECHNICAL FIELD AND INDUSTRIAL APPLICABILITY

The present disclosure relates generally to nuclear fission reactors and structures related to nuclear fission reactors, in particular for propulsion. Such nuclear propulsion fission reactors may be used in various non-terrestrial applications, such as space and ocean environments. In particular, the disclosure relates to a method for fabricating a ceramic-metal (CERMET) fuel element with integrated coolant channels that will be incorporated into a fuel assembly for a thermal propulsion reactor and a method for fabricating such a CERMET fuel element. A fuel assembly incorporating the CERMET fuel element is capable of heating hydrogen propellant to temperatures required to achieve specific impulse ($I_{sp}$) values in the range of 800 to 1000 seconds.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Various propulsion systems for non-terrestrial applications, such as in space, have been developed. A typical design for a nuclear thermal propulsion (NTP) reactor and engine 10 is shown in FIG. 1. The illustrated nuclear thermal propulsion reactor and engine 10 includes four main features: a vessel 20 having a reactor 22 contained within a reflector 24, turbomachinery 30 including turbo pumps 32 and other piping and support equipment 34, shielding 40 (which is shown as internal shielding in between the turbomachinery 30 from the vessel 20, but can also be external shielding), and a nozzle section 50 including a nozzle 52 and a nozzle skirt 54. Prior NTP reactors focused on CERMET fuel (ceramic fuel particles uniformly dispersed in a refractory metal matrix phase) using high-enriched uranium (HEU) and had solid fuel forms with a hexagonal cross-section including coolant flow channels or had fuel forms created from thin-plate material.

Despite the state of the art for NTP reactors, there remains a need for improved designs and manufacturing techniques to realize propulsion systems for NTP applications that balance thrust and specific impulse to provide performance that is tailored to specific missions.

SUMMARY

Presently, there is a need for improvements directed to NTP applications in which the specific impulse is in the range of 800 to 1000 seconds, alternatively 800 to 900 seconds. This translates to propellant (i.e., hydrogen propellant) exit temperatures from the reactor in excess of 2700 Kelvin (K), and thus fuel temperatures in excess of 2900K. Additionally, there is a need to implement high-assay low-enriched uranium (HALEU) fuels, so as to eliminate the use of high-enriched uranium fuel. However, reactors using HALEU fuel require significant moderation to produce a thermal neutron spectrum. Further, fabrication of an acceptable refractory metal-based CERMET HALEU fuel element is extremely challenging and the innovations described herein are directed at methods to facilitate fabrication of the CERMET fuel elements.

In general, the disclosure is directed to a nuclear fission reactor structure suitable for use in a nuclear-based propulsion system, such as nuclear thermal propulsion. In exemplary embodiments, the nuclear fission reactor structure utilizes a CERMET fuel element that is incorporated into a fuel assembly. As used herein, CERMET fuel element refers to CERMET fuel meat with associated cladding, CERMET fuel meat refers to ceramic fuel particles in a metal matrix, and ceramic fuel particle refers to a fuel kernel and associated coating (if applicable). In exemplary embodiments, the CERMET fuel element includes a plurality of coolant channels distributively arranged in the CERMET fuel meat. Additional features of the fuel assembly include an insulation layer and a structural refractory carbide layer that are, collectively, outward of the CERMET fuel element. The nuclear fission reactor structure comprises a plurality of the fuel assemblies distributively arranged in a moderator block.

In NTP applications, the nuclear fission reactor structure is housed in a vessel of a nuclear thermal propulsion reactor and engine. A propulsion gas is used as a coolant for the nuclear fission reactor structure. Propulsion gas superheated in the nuclear fission reactor structure exits through a nozzle and generates thrust and impulse.

An example CERMET fuel element comprises a CERMET fuel meat (also called herein a fuel meat) that includes ceramic fuel particles having a composition including HALEU with a U-235 assay above 5 percent and below 20 percent. The CERMET fuel meat is formed into a CERMET fuel element with a plurality of coolant channels extending through the CERMET fuel element. The coolant channels (typically of tubular-shape) have a layer of tungsten-containing alloy (cladding) to separate the hydrogen propellant flowing though the coolant channels from the material of the CERMET fuel meat. The CERMET fuel element has an axial centerline defining a longitudinal axis and the plurality of coolant channels extend in a longitudinal direction (relative to the longitudinal axis of the CERMET fuel element) from a first end surface of the CERMET fuel element to a second end surface of the CERMET fuel element. In a cross-section of the CERMET fuel element perpendicular to the longitudinal axis of the CERMET fuel element, the plurality of coolant channels are distributively arranged in the CERMET fuel element.

Disclosed CERMET fuel elements can be incorporated into a nuclear fission reactor structure. Thus, an example nuclear fission reactor structure comprises a moderator block including a plurality of fuel assembly openings; and a plurality of the fuel assemblies. Each of the plurality of fuel assemblies is located in a different one of the plurality of fuel assembly openings and, in a cross-section of the moderator block perpendicular to a longitudinal axis of the nuclear fission reactor structure, the plurality of fuel assemblies are distributively arranged in the moderator block.

Embodiments disclosed herein also include a nuclear thermal propulsion engine comprising the disclosed nuclear propulsion fission reactor structure. In forming the nuclear thermal propulsion engine, shielding, a reservoir for cryogenically storing a propulsion gas, turbomachinery, and a nozzle, are operatively attached to the reactor structure with the shielding, turbomachinery, and the reservoir operatively mounted to the entrance openings of the plurality of fuel assemblies to provide a flow path from the reservoir to the nuclear propulsion reactor; and the nozzle operatively mounted to the exit openings of the plurality of fuel assemblies. The nozzle provides a flow path for superheated propulsion gas exiting the nuclear propulsion fission reactor structure.

The nuclear fission reactor structure can be incorporated into a nuclear thermal propulsion engine. An example nuclear thermal propulsion engine comprises the disclosed nuclear propulsion fission reactor structure, shielding, a reservoir for cryogenically storing a propulsion gas, turbomachinery, and a nozzle. In a flow path of the propulsion gas, the shielding, the turbomachinery, and the reservoir are operatively mounted upstream of the inlet connection assembly, and the nozzle is operatively mounted downstream of the outlet connection assembly.

The CERMET fuel element having a plurality of coolant channels and that is incorporated into the fuel assembly can be manufactured by suitable consolidating means. An example method of manufacturing such a CERMET fuel element comprises (i) assembling a plurality of channel blanks in spaced-apart relation inside a can assembly for a hot-isostatic pressing (HIP) process, wherein assembling includes attaching a first end of each channel blank to a fixture of the can assembly and forming, by the spaced-apart relation, a void space between the plurality of channel blanks, and wherein an outer surface of each channel blank includes a plurality of spacer structures, each spacer structure sized to provide uniform separation distance between each channel blank, (ii) adding a first plurality of ceramic fuel particles to the void space, wherein the ceramic fuel particles include a fuel kernel having a composition including HALEU with a U-235 assay above 5 percent and below 20 percent and a coating containing a refractory metal, such as tungsten or molybdenum and tungsten, (iii) sealing the can assembly, and (iv) consolidating the plurality of ceramic fuel particles by HIP processing the sealed can assembly at an elevated temperature and an elevated pressure, whereby the consolidated ceramic fuel particles form the CERMET fuel meat of the CERMET fuel element and at least portions of the channel blank form cladding of the CERMET fuel element that separates propellant flowing though coolant channels from the CERMET fuel meat.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

Figure 1:
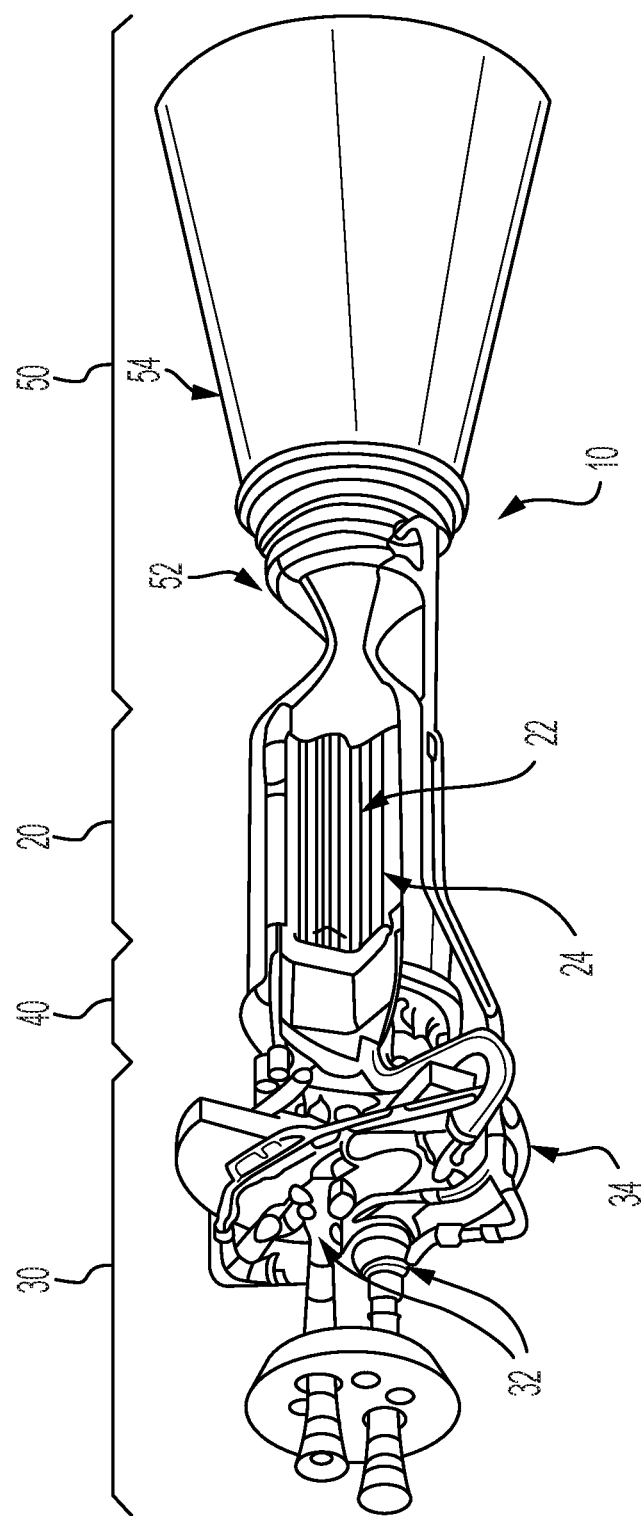
FIG. 1 illustrates structure and arrangement of features in a typical design for a nuclear thermal propulsion reactor and engine.

For ease of viewing, in some instances only some of the named features in the figures are labeled with reference numerals.

DETAILED DESCRIPTION

Figure 2B:
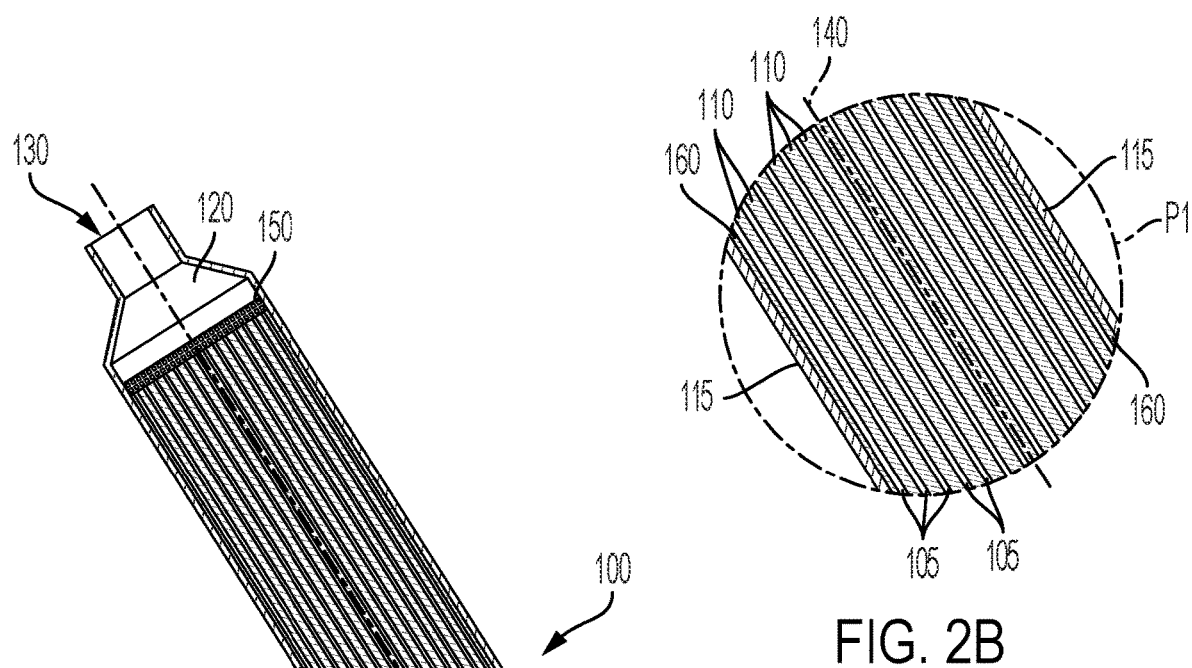
FIGS. 2A and 2B. schematically illustrate, in a longitudinal cross-sectional view, an embodiment of a fuel assembly.
Figure 2A:
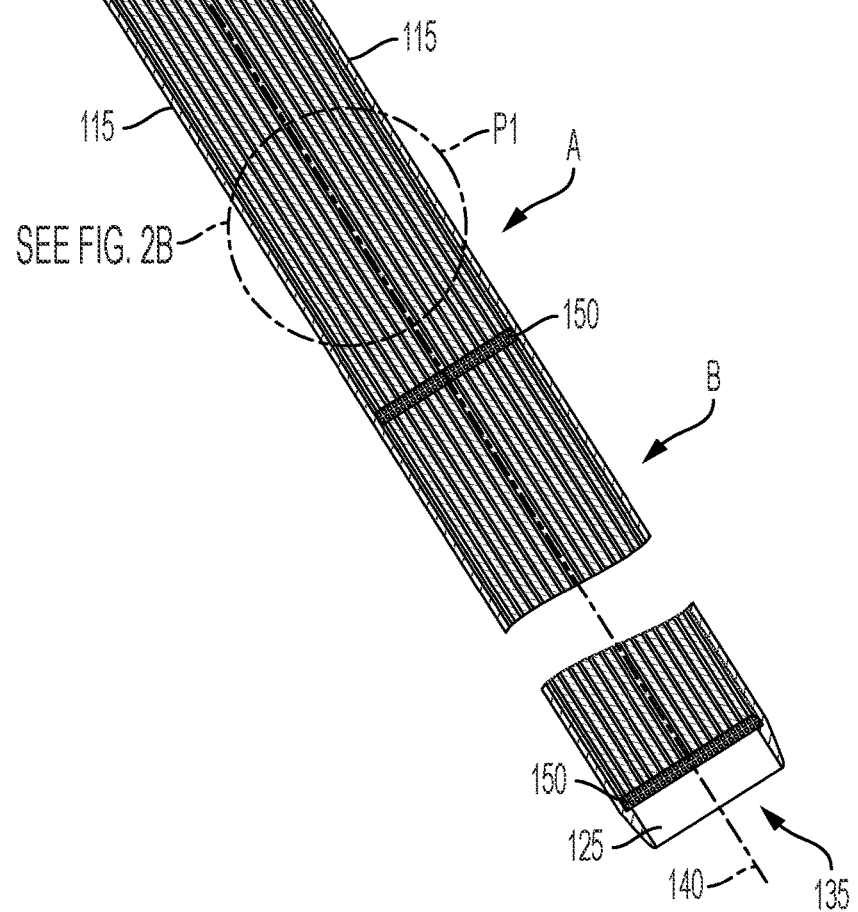

FIGS. 2A and 2B. schematically illustrate, in a longitudinal cross-sectional view, an embodiment of a CERMET fuel element contained within a fuel assembly. FIG. 2B is a magnified view of region P1 of FIG. 2A. The exemplary fuel assembly 100 includes a CERMET fuel element 110 that has a plurality of distributively arranged coolant channels 105. In the cross-sectional view in FIGS. 2A and 2B, the CERMET fuel element 110 and the coolant channels 105 are alternating in the plane of the cross-section, but (and as more easily seen in FIG. 3) the coolant channels 105 are through-holes within the CERMET fuel element 110.

The CERMET fuel element 110 is contained within a fuel assembly outer structure 115, which connects an inlet tube 120 (at a first end of the fuel assembly 100) to an outlet tube 125 (at a second end of the fuel assembly 100). Typically, an entrance opening 130 of the inlet tube 120 has a smaller cross-sectional area than an exit opening 135 of the outlet tube 125. Typically, the fuel assembly 100 is elongated and is tubular-shaped and has an axial centerline defining a longitudinal axis 140. The plurality of fuel element coolant channels 105, which are also typically elongated and tubular-shaped and with each having their own longitudinal axis, extend in the same direction as the longitudinal axis 140 from a first end surface of the CERMET fuel element 110 to a second end surface of the CERMET fuel element 110. The CERMET fuel element 110 also extends in a longitudinal direction relative to the longitudinal axis 140. Both the CERMET fuel element 110 and the fuel element coolant channels 105 are, preferably, axisymmetric about the longitudinal axis 140.

In some embodiments, the CERMET fuel element 110 is a single body contained within the fuel assembly outer structure 115. In other embodiments, multiple CERMET fuel elements 110 are contained with the fuel assembly outer structure 115. In which case, the individual CERMET fuel elements 110, such as bodies A and B in FIG. 2A, are separated by a support mesh 150. The support mesh 150 is a structure traversing the inner volume of the fuel assembly outer structure 115 (typically in a plane perpendicular to the longitudinal axis 140). In exemplary embodiments, the support mesh 150 includes openings traversing a thickness of the support mesh 150 to allow coolant flow through the support mesh 150. For example, the openings in the support mesh 150 are configured to allow coolant flowing through the fuel assembly 100 from entrance opening 130 and out through exit opening 135 to flow through the openings. In arrangements with either a single CERMET fuel element or multiple CERMET fuel elements, a support mesh 150 is also typically included at the first end of the fuel assembly 100 and at the second end of the fuel assembly 100.

The exemplary fuel assembly 100 can also include an insulation layer 160, which is interposed between the inner surface of the fuel assembly outer structure 115 and an outer surface of the CERMET fuel element 110 (or elements), such as a side surface extending between the first end surface and the second end surface of the CERMET fuel element 110. The inner surface of the insulation layer 160 is outward of, and can be spaced apart from, the outer surface of the CERMET fuel element 110 (or elements) to form a gap. This gap functions to provide additional thermal insulation and contributes to reducing the thermal gradient imposed on the insulation layer 160 and fuel assembly outer structure 115. The fuel assembly outer structure, the insulation layer and the gap are more readily shown in FIGS. 2B and 3.

Figure 3:
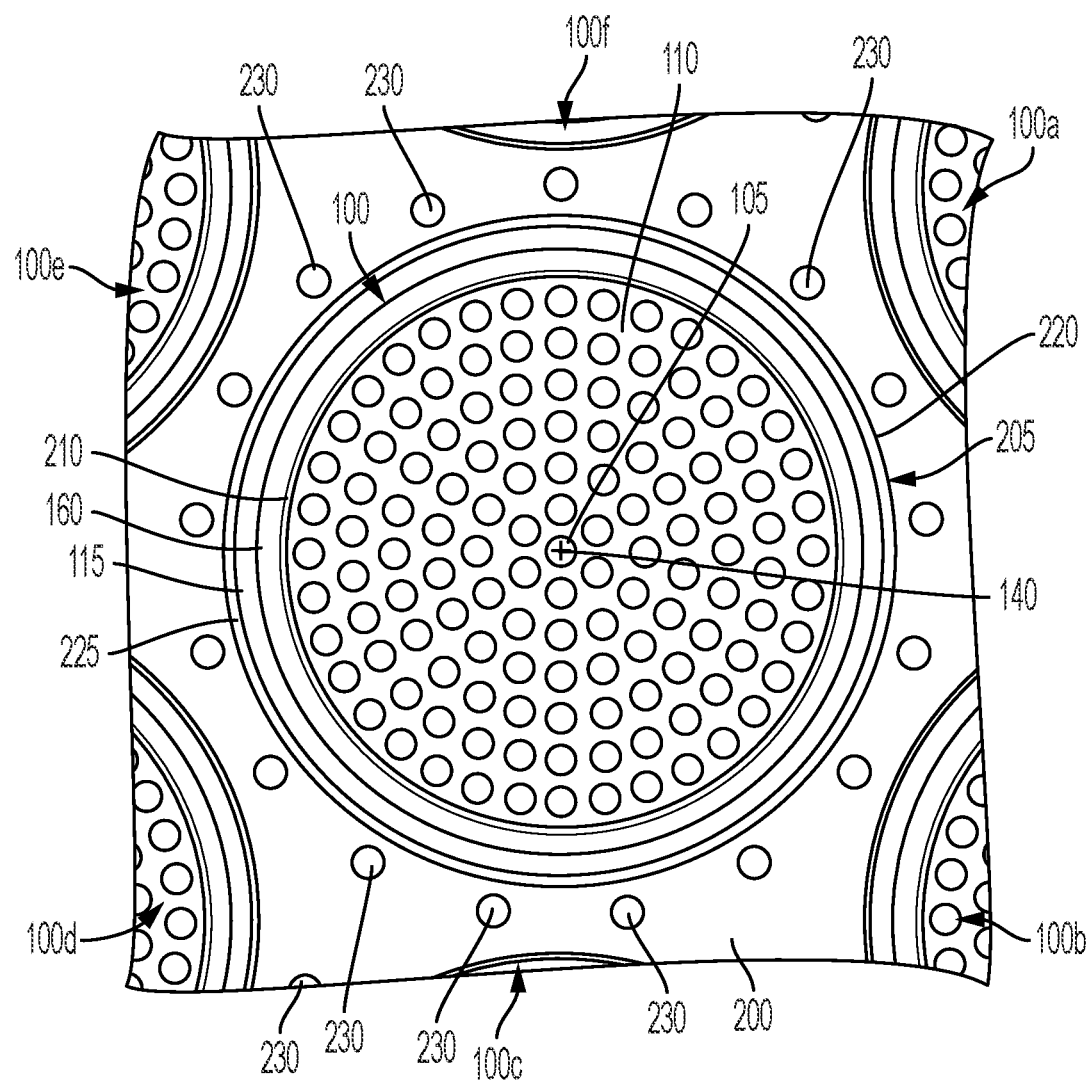
FIG. 3 schematically illustrates, in a radial cross-sectional view, an embodiment of a fuel assembly in a nuclear fission reactor structure.

FIG. 3 schematically illustrates, in a radial cross-sectional view, an embodiment of a fuel assembly in a nuclear fission reactor structure. The illustrated radial cross-sectional view shows a portion of a plane perpendicular to a longitudinal axis of the nuclear fission reactor structure. Centrally located within the FIG. 3 view is one fuel assembly 100. Portions of additional fuel assemblies 100a-f are also shown in FIG. 3 and are distributively arranged in the moderator block 200. In particular, the moderator block 200 includes a plurality of fuel assembly openings 205 and each one of the plurality of fuel assemblies 100 is located in a different one of the plurality of fuel assembly openings 205.

As seen in FIG. 3, the plurality of fuel element coolant channels 105 are distributively arranged in the CERMET fuel element 110. Each fuel element coolant channel 105 includes an inner layer forming a surface of the fuel element coolant channel 105 and about which the CERMET fuel element 110 (which contains the CERMET fuel meat) is located. In exemplary embodiments, the inner layer is a layer or a tube or other continuous, non-porous structure that surrounds the fuel element coolant channel 105 and includes an entrance opening at a first end to allow for fluid communication with the components upstream of the fuel assembly 100, such as turbomachinery or a reservoir of coolant, and an exit opening at a second end for fluid communication with components downstream of the fuel assembly 100, such as a nozzle section. In exemplary embodiments, the inner layer is a 25 to 100 micron, alternatively 50 to 75 micron, thick layer of a Mo—W alloy (such as a Mo-30W alloy) or tungsten that protects the ceramic fuel kernels within the CERMET fuel element 110 from the coolant (such as hydrogen) flowing through the fuel element coolant channel 105.

In some embodiments, the metal matrix phase of the CERMET fuel meat in the CERMET fuel element 110 includes a tungsten content of at least 25%, alternatively, at least 30%, to provide an adequate margin to melt (i.e., the solidus temperature), and a tungsten content at or less than 50%, alternatively less than 40%, to avoid excessive thermal neutron absorption. For example, the tungsten-containing alloy is a molybdenum-tungsten alloy (Mo—W alloy) containing 25 wt % to 50 wt % tungsten, alternatively, 30 wt % to 40 wt % or 30 wt % to 36 wt % tungsten. Such a matrix phase can be incorporated into a reactor designed to operate at an Isp of up to about 900 seconds. For a higher Isp (e.g., 1000 seconds), a matrix phase with a higher W content up to pure W can be used. In one example, isotopically purified tungsten enriched in W-184 is used to minimize parasitic thermal neutron absorption.

Also, in general, the CERMET fuel meat includes a fissionable nuclear fuel located within the refractory metal alloy matrix material. For example, the fissionable nuclear fuel can be UN fuel kernels and can be located within a Mo-30W alloy matrix phase. The concentration of UN fuel can be in the range of 30 to 70 volume percent. However, the proportions of the matrix phase and ceramic fuel kernels may vary radially and axially within a fuel assembly 100 to influence the neutronics of the NTP reactor.

In exemplary embodiments, the CERMET fuel element 110 includes CERMET fuel meat containing fuel particles having a composition including HALEU with a U-235 assay above 5 percent and below 20 percent. However, the manufacturing process can also be applied when using fuel material having a higher U-235 enrichment, such as U-235 assay above 20 percent or high-enriched uranium.

Although the disclosed manufacturing process is relevant to many different fuel types, for design safety considerations in NTP reactors suitable fuels are principally HALEU with a U-235 assay above 5 percent and below 20 percent. For example, a suitable fissionable nuclear fuel composition for the matrix includes uranium oxide ($UO_2$), uranium nitride (UN), and other stable fissionable fuel compounds, all of which have a U-235 enrichment that is less than 20%. Burnable poisons may also (optionally) be included in the metal matrix phase of the CERMET fuel meat of the CERMET fuel element 110. Typically, the fissionable nuclear fuel composition is in the form of a CERMET, such as $UO_2$ with W or Mo (or mixtures thereof) and UN with W or Mo (or mixtures thereof). In one particular embodiment, the composition of the CERMET fuel includes uranium nitride (UN), tungsten, and molybdenum. In another particular embodiment, the composition of the CERMET fuel includes uranium oxide ($UO_2$), tungsten, and molybdenum.

As seen in FIG. 3 and as previously noted, exemplary embodiments of the fuel assembly 100 can also include an insulation layer 160, which is interposed between the inner surface of the fuel assembly outer structure 115 and an outer surface of the CERMET fuel element 110. The inner surface of the insulation layer 160 can be spaced apart from the outer surface of the CERMET fuel element (or elements) 110 to form a gap 210. Typically, the insulation layer 160 is outward of the side surface of a CERMET fuel element 110. In exemplary embodiments, the insulation layer 160 has a composition including porous zirconium carbide and the fuel assembly outer structure 115 has a composition including a refractory carbide, preferably including silicon carbide, such as silicon carbide fiber reinforced, silicon carbide matrix (SiC—SiC) composite. The fuel assembly outer structure 115 having a composition including a refractory carbide is also known as a structural refractory carbide layer.

FIG. 3 also illustrates the spatial relationship of the fuel assembly 100 and the fuel assembly openings 205 (defined by periphery 220) in the moderator block 200. In particular, in the illustrated embodiment, the outer surface of the fuel assembly outer structure 115 is spaced apart from the inner surface of the fuel assembly openings 205 in the moderator block 200 to form a gap 225. This gap 225 can contain (non-flowing) hydrogen gas and can provide additional thermal insulation properties.

In some embodiments, the outer surface of the fuel assembly 100, i.e., the fuel assembly outer structure 115, can include a dense carbide coating, such as SiC, for structural reasons.

In some embodiments, a barrier to erosion of the CERMET fuel meat integral to the CERMET fuel element 110 by coolant can be included on an exterior surface of the CERMET fuel element 110. The barrier is formed by a coating (or cladding) of a 25 to 100 μm, alternatively 50 to 100 μm or 75 to 100 μm, thick layer of Mo—W alloy along the length of the CERMET fuel element 110, although the use of a pure W coating may be preferred toward the exit (hottest) end of the fuel assembly 100.

The moderator block 200 occupies the space between the fuel assemblies 100. The moderator block 200 is typically a monolithic body or an assemblage of a plurality of monolithic bodies, such as slabs, blocks, slices or wedges, having a composition capable of thermalization (or moderation) of neutrons formed in the fuel assembly 100. Thermalization reduces the energy of the neutrons to values in the range of ≤1 eV. In exemplary embodiments, the moderator block 200 has a composition including zirconium hydride (ZrH), beryllium (Be), beryllium oxide (BeO), graphite or combinations thereof. In a particular embodiment, the moderator block 200 has a composition including zirconium hydride (ZrH), in particular zirconium hydride in which the H:Zr ratio ranges from 1.85 to 1.95, e.g., $ZrH_{1.85}$ to $ZrH_{1.95}$, such as $ZrH_{1.9}$.

The moderator block 200 includes a plurality of moderator block coolant channels 230. The moderator block coolant channels 230 extend in a longitudinal direction relative to the longitudinal axis of the nuclear fission reactor structure from a first end surface of the moderator block 200 to a second end surface of the moderator block 200. The longitudinal axis of the nuclear fission reactor structure is typically parallel to the longitudinal axis 140 of the fuel assembly 100 and, relative to FIG. 3, if a fuel assembly 100 is located along the axial centerline of the nuclear fission reactor structure, the longitudinal axis of the nuclear fission reactor structure is coincident with longitudinal axis 140 of the fuel assembly 100. The plurality of moderator block coolant channels 230 are in spaced-apart relation to, and distributed about, the periphery 220 of each of the plurality of fuel assembly openings 205 in the moderator block 200. The spacing and distribution of the moderator block coolant channels 230 are generally governed by thermal management and neutronics of the fuel assembly 100 and of the nuclear fission reactor structure. In the example embodiment shown in FIG. 3, the moderator block coolant channels 230 are approximately 2 to 6 millimeters (mm) in diameter, alternatively 4 to 6 mm in diameter, and are evenly distributed circumferentially about the periphery 220 of the fuel assembly openings and are spaced within 2 to 12 mm, such as within 2 to 6 mm or within 6 to 12 mm, of the periphery 220.

When describing both the arrangement of the plurality of fuel element coolant channels 105 in the CERMET fuel element 110 and the arrangement of the fuel assemblies 100 in the moderator block 200, distributively arranged means in substantially uniformly spaced relationship and with a repetitive or symmetry pattern consistent with the neutronics and thermal management requirements of the CERMET fuel element, fuel assembly, and/or the nuclear fission reactor structure. As an example, fuel assemblies 100a-f are arranged in a hexagonal pattern around central fuel assembly 100. As another example, the innermost ring of fuel element coolant channels 105 are arranged in a hexagonal pattern around a central fuel element coolant channel 105. Other distributive arrangements can be utilized, including other axisymmetric arrangements, such as based on a triangle, a square, an octagon or a decagon. It is also noted that in FIG. 3, the central fuel element coolant channel 105 is coincident with the longitudinal axis 140 of the fuel assembly 100. The distributive arrangement of the fuel element coolant channels 105 in the CERMET fuel element 110 and the distributive arrangement of the fuel assemblies 100 in the moderator block 200 may have the same or different distributive arrangements.

In one particular embodiment, the fuel element coolant channels 105 have a diameter of 2-4 millimeters (mm) and are circumferentially spaced (from nearest coolant channels at the same radial distance from the longitudinal axis 140) at a distance of 1-5 mm and are radially spaced (from nearest coolant channels at the next radially inward and next radially outward position) at a distance of 1-10 mm. In one particular embodiment, the CERMET fuel element 110 has a diameter of 45-60 mm, alternatively 50-56 mm, the insulation layer 160 has a thickness in the radial direction of 2-6 mm, alternatively 2-4 mm, and the fuel assembly outer structure 115 has a thickness in the radial direction of 2-6 mm, alternatively 2-4 mm. However, other embodiments can have more or fewer coolant channels and the dimensions for the various features, structures, and components can vary according to design aspects, such as neutronics, thermodynamics, weight and space requirements.

Also, the additional fuel assemblies 100a-f have similar features and arrangement of features as described with respect to fuel assembly 100.

Figure 4:
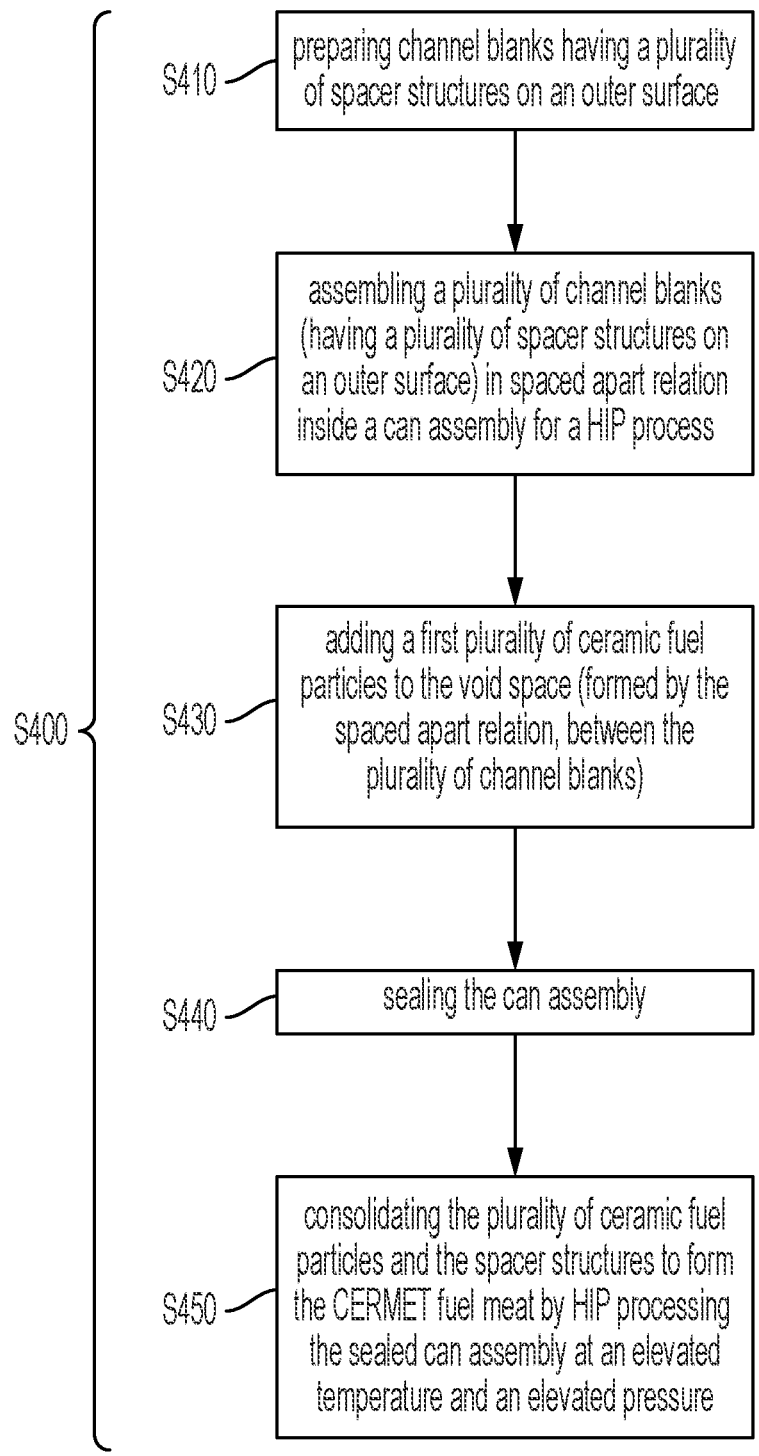
FIG. 4 is a flow diagram setting forth basic steps in an embodiment of a method of manufacturing a fuel element.
Figure 5A:
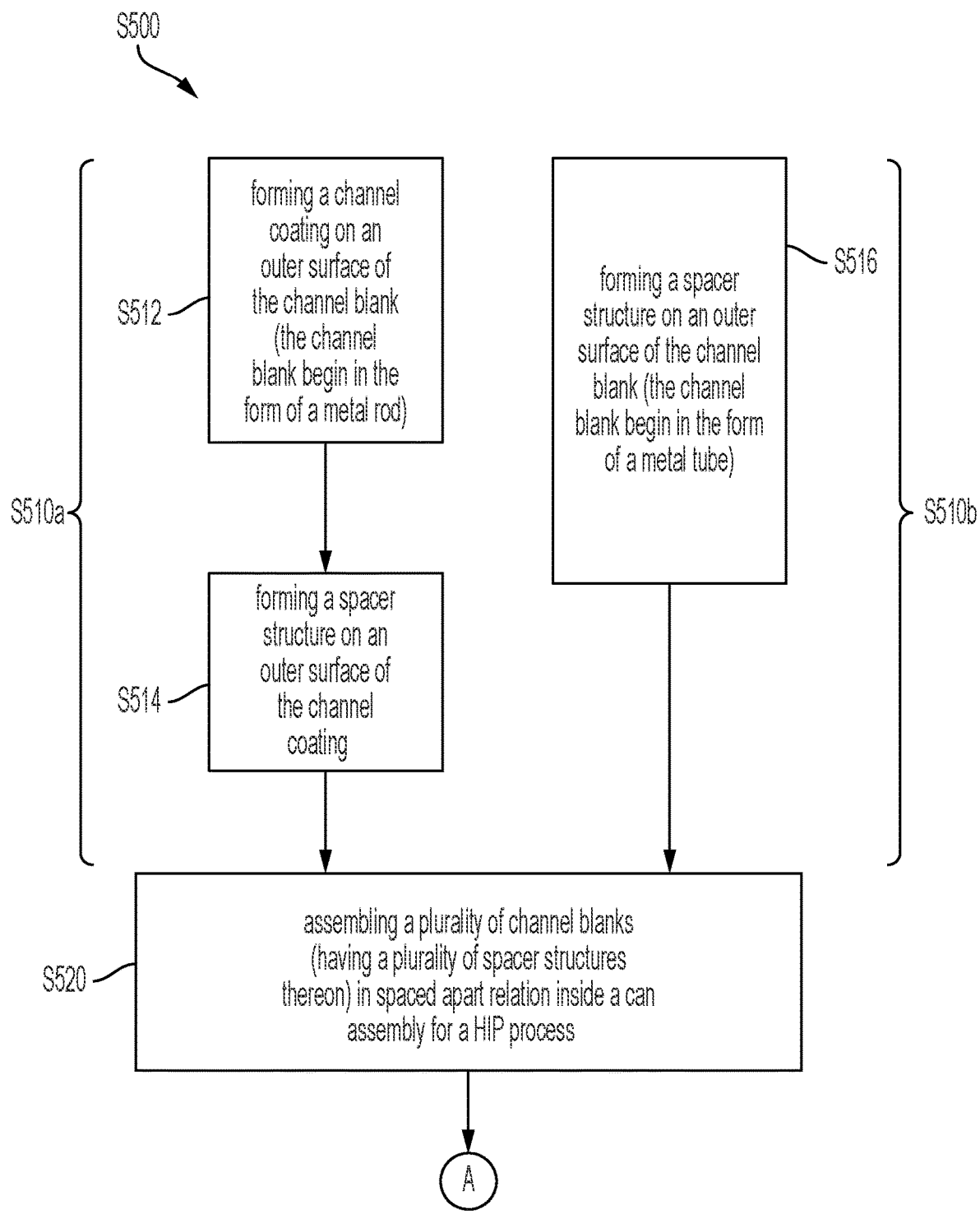
FIGS. 5A to 5D is a flow diagram setting forth various steps in embodiments of a method of manufacturing a CERMET fuel element.
Figure 5B:
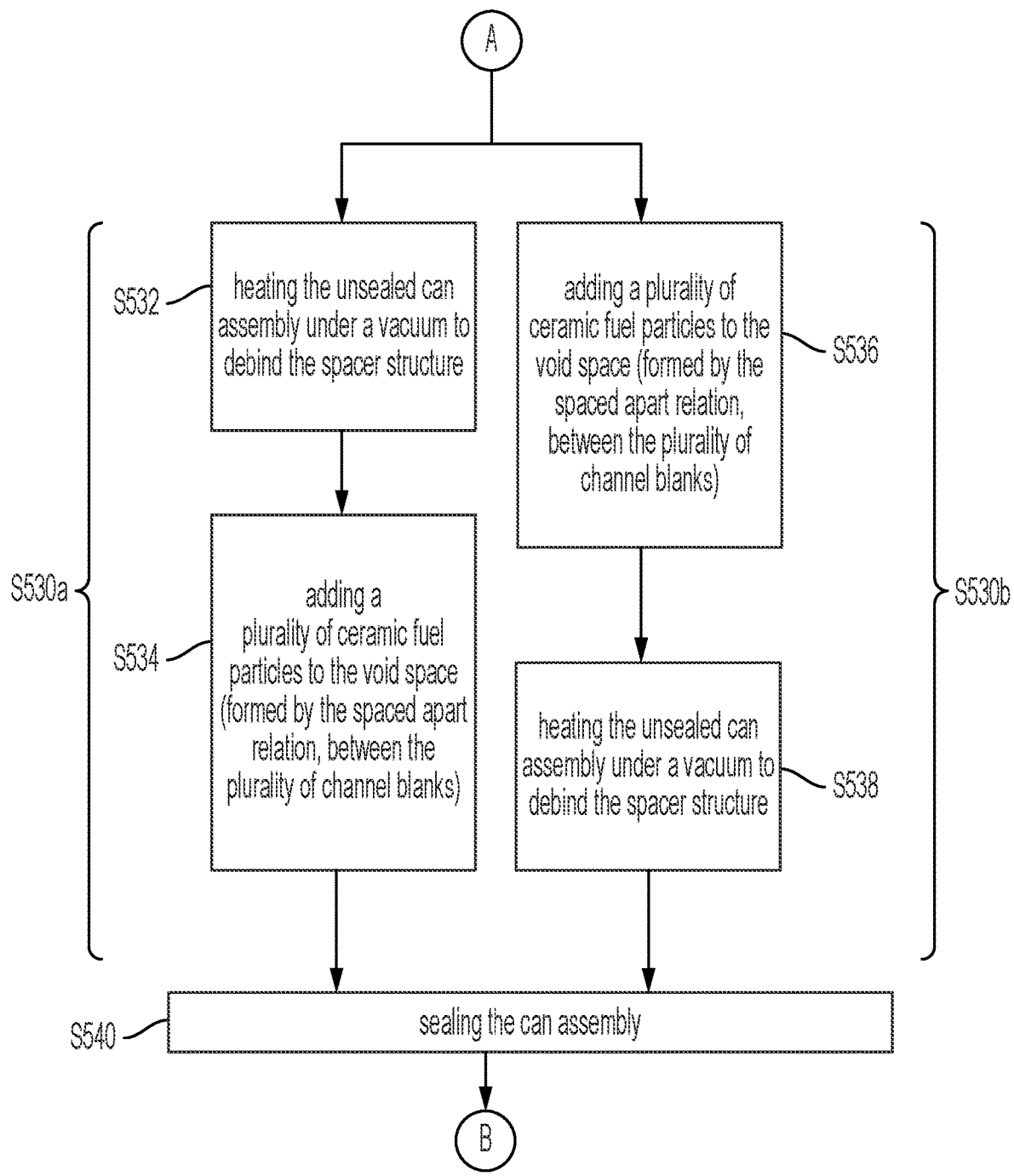
Figure 5C:
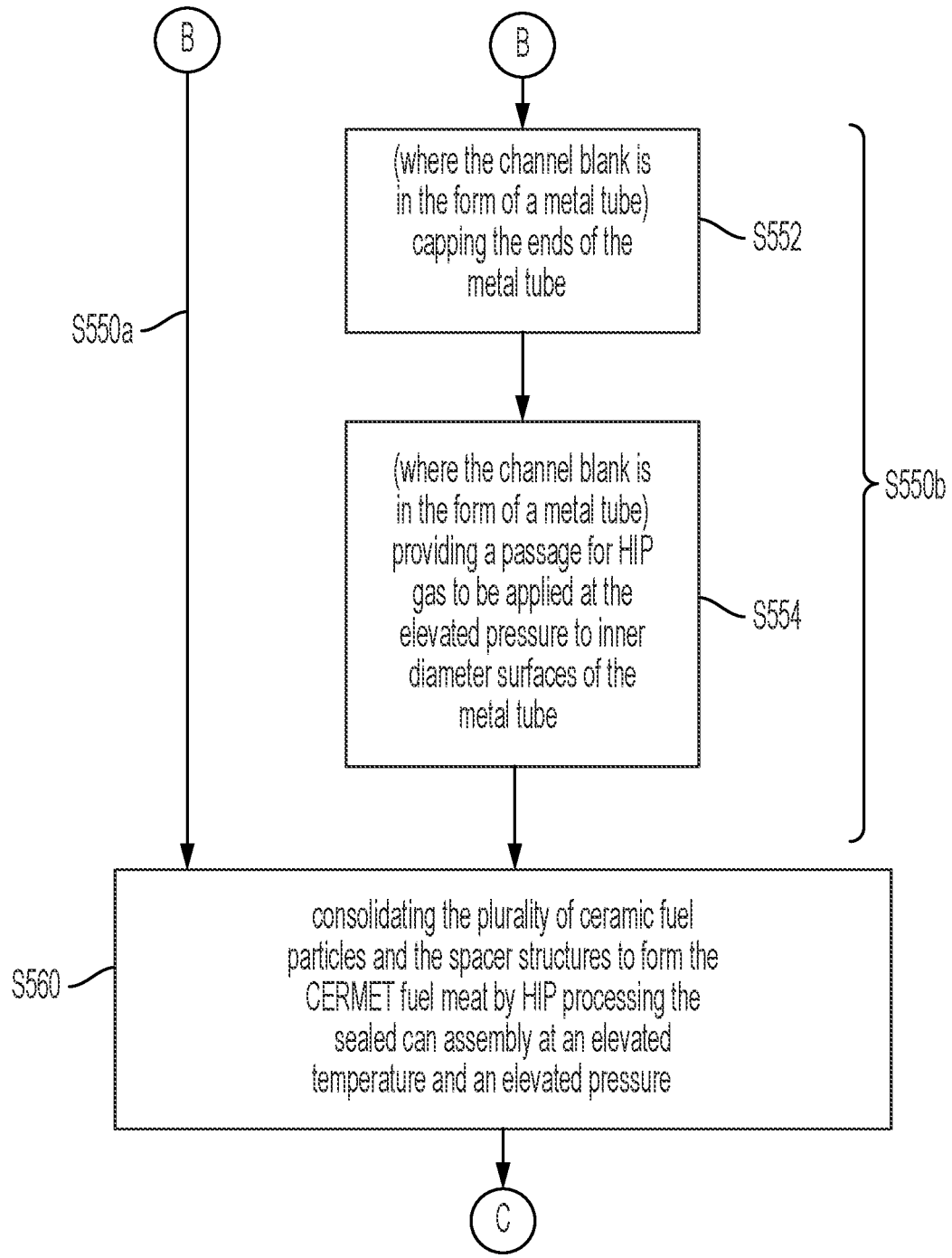
Figure 5D:
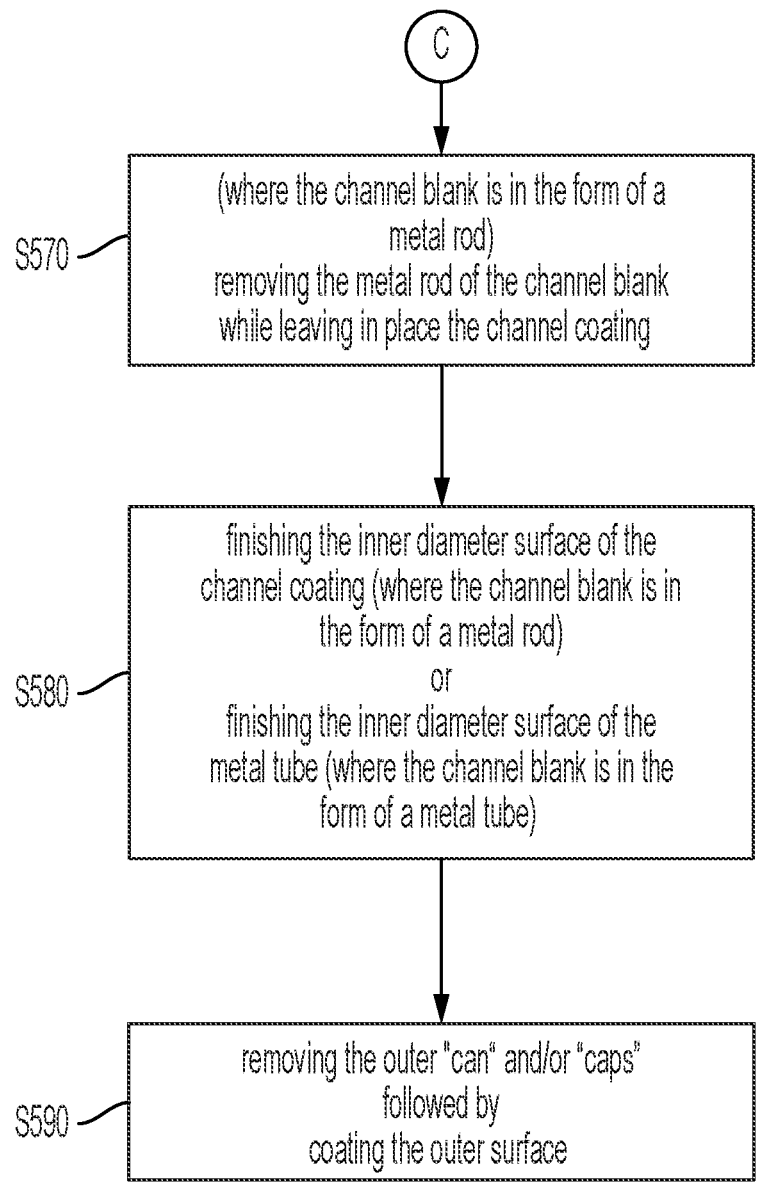

FIG. 4 is a flow diagram setting forth basic steps in an embodiment of a method of manufacturing a CERMET fuel element. For example, in general, in embodiments of a method S400 of manufacturing a fuel element, such as the fuel element 110 incorporated into a fuel assembly 100 shown and described in relation to FIGS. 2A-2B and 3, channel blanks are prepared S410 and a plurality of channel blanks are S420 assembled in spaced-apart relation inside a can assembly for a HIP process. In some embodiments, the channel blanks are assembled by use of a fixture which holds or constrains an end or end portion of the channel blank. In exemplary embodiments, this fixture becomes part of the can assembly for the HIP process or can be enclosed within the can assembly.

The channel blanks can be of various forms, as discussed further herein. Common to the channel blanks are the inclusion of a plurality of spacer structures. The spacer structures are on an outer surface and are suitably sized so as to contribute to a desired spacing separating nearest neighbor channel blanks. In some embodiments, the spacer structure is sized to provide uniform separation distance between each channel blank. In one aspect, the spaced-apart relation of the channel blanks assembled in the can assembly form a void space between the channel blanks, e.g., the void space being the negative space between the assembled channel blanks. Components that will form portions of the CERMET fuel meat are added to the void space S430. Example components include a plurality of ceramic fuel particles. In some embodiments, the ceramic fuel particles are spheroidal and have a uniform diameter (within ±10%).

In exemplary embodiments, the ceramic fuel particles have a kernel with a composition including HALEU with a U-235 assay above 5 percent and below 20 percent and a coating having a composition including tungsten or containing molybdenum and tungsten. In exemplary embodiments, the coating is a layer having a composition including a molybdenum-tungsten alloy (Mo—W alloy) in which an amount of tungsten ranges from 25 wt % to 50 wt % tungsten, alternatively, 30 wt % to 40 wt % or 30 wt % to 36 wt % tungsten, and the balance molybdenum.

In some embodiments, the composition of the coating on kernels making the ceramic fuel particles can vary based on axial position within the fuel assembly 100. For example, a coating having a composition of pure tungsten may be preferred in locations of higher temperature within the fuel assembly 100, such as in the region near the outlet tube 125 at the second end of the fuel assembly 100. In one such embodiment, the amount of tungsten included in the coating can vary with axial position, such as along a gradient (either uniform or non-uniform) from 100 wt % tungsten to the tungsten content of 25 wt % to 50 wt % of the molybdenum-tungsten alloy used for the majority volume of the CERMET fuel element 110.

After adding components that will become part of the CERMET fuel element 110 to the void space S430 to a desired volume or amount or loading level, the can assembly is sealed S440 in preparation for the HIP process. HIP processing S450 the sealed can assembly at an elevated temperature, such as 1250 to 1700° C., and an elevated pressure, such as 120 MPa to 300 MPa, consolidates the components that will form the CERMET fuel meat, e.g., the plurality of ceramic fuel particles added to the void space and the spacer structures included with the channel blanks, to form a CERMET fuel element 110. The elevated temperature can be material dependent, with temperatures of 1250 to 1350° C. used for Mo—W alloys such as Mo-25% W, but higher temperatures of 1600 to 1700° C. for pure W.

In exemplary embodiments, the temperature and pressure conditions used for HIP processing are selected to produce a CERMET fuel element 110 wherein the CERMET fuel meat has a density greater than 95% theoretical density (i.e., containing less than 5% porosity). Additionally, the temperature and pressure conditions used for HIP processing are selected so as to consolidate the spacer structures on the outer surface of the channel blanks with the components that were added to the void space, in particular with the ceramic fuel particles. FIG. 3 schematically illustrates in cross-section an exemplary structure in which the spacer structures have been consolidated with the components in the void space, such as the ceramic fuel particles, to form the CERMET fuel meat. The exemplary structure has cooling passages, i.e., the fuel element coolant channels 105, positioned in a distributive manner via the spacer structures in the CERMET fuel element 110. In contrast, unacceptable consolidation is characterized by features such as blockage of cooling passages or non-uniform cooling passage grouping sufficient to cause overcooled or undercooled regions in the CERMET fuel element 110, which potentially limit the performance of the reactor system. Other indications of unacceptable consolidation includes (i) voids within the CERMET fuel element 110 having a size (measured as a diameter) that is substantially larger than the size of the ceramic fuel particles, (ii) fragmented ceramic fuel kernels, (iii) axial or radial cracks within the CERMET fuel meat, (iv) lack of bonding between the CERMET fuel meat and the fuel channel cladding (whether in the form of the channel coating 704 on the metal rod 702 or in the form of the metal tube 732), and (v) axial or radial cracks within the fuel channel cladding (whether in the form of the channel coating 704 on the metal rod 702 or in the form of the metal tube 732) or fuel element external cladding (if formed as part of the consolidation process).

Evaluation of the consolidation process and consolidated structures can be conducted by suitable means. For example, visual inspection, optionally with the aid of a die penetrant, can be used to detect pin holes or cracks in cladding. Non-destructive examination methods, such as ultrasonic processes, may also be used to inspect the HIP'ed components. Finally, the example method for ascertaining whether the process objective have been met and to evaluate the quality of the consolidation process, including details regarding the CERMET microstructure, is to perform destructive examinations that involve preparing cross sections of HIP'ed components, followed by microscopic examination.

The protocol for HIP processing should proceed such that refractory metal materials in the can assembly have adequate ductility before the gas pressure is raised to consolidation conditions for the components that form the CERMET fuel element 110. For example, the temperature should be raised sufficiently above the ductile-brittle transition temperature (DBTT) for the refractory metal materials in the can assembly (for example, above about 40% of the solidus or above 200 to 500° C., depending on the matrix phase composition in the CERMET fuel element 110) before the pressure conditions used for HIP processing are raised above a pressure that would damage, e.g., by cracking, the HIP can assembly or the coating of the ceramic fuel particles (for example, above 100 MPa). This protocol for HIP processing contributes to consolidating the matrix phase without damaging the HIP can assembly or the ceramic fuel kernels.

In exemplary embodiments, during the loading of components that will form portions of the CERMET fuel meat, e.g., a plurality of ceramic fuel particles, of the CERMET fuel element 110, the spacer structures contribute to maintaining the positioning of the channel blanks. In exemplary embodiments, the spacer structures have a composition that includes at least some of the same constituents as the composition of the ceramic fuel particles. In such a case, upon consolidation, common constituents of the spacer structures and the components loaded into void spaces will form an integral CERMET fuel element 110, although artifacts of the spacer structures may remain within the integral CERMET fuel element 110, such as in the form of a different Mo—W composition if different Mo—W alloys were used for the spacer structure and the ceramic fuel particles. In alternative embodiments, there is complete identity of all constituents in the composition of the spacer structures and in the composition of other regions of the CERMET fuel element 110. In other alternative embodiments, there is complete identity of non-fuel constituents in the composition of the spacer structures and in the composition of the CERMET fuel element 110.

FIGS. 5A to 5D is a flow diagram setting forth various steps in embodiments of a method of manufacturing a CERMET fuel element. The method S500 illustrates more details on the various steps presented in FIG. 4.

The illustration of the method S500 in FIGS. 5A to 5D starts with preparing channel blanks having a plurality of spacer structures on an outer surface.

In one embodiment S510a, the channel blank 700 is in the form of a refractory metal rod 702 and the method S512 forms a channel coating 704 on an outer surface of the channel blank 700 followed by S514 forming the spacer structures 706 on the outer surface 708 of the channel coating 704. For example, a molybdenum (Mo) rod having the appropriate diameter and axial length (relative to the diameter and length of the finished fuel element coolant channel 105, i.e., the final diameter and the final length) is used. The diameter of the rod may be equal to or slightly smaller than the desired final dimension, but cannot be larger; however, the length of the rod is preferably greater than that of the finished fuel element coolant channel 105 to allow for machining (as discussed further herein). Another material that is suitable for hot isostatic pressing, yet removable by, for example, etching or electrochemical machining (ECM), and that is compatible with the adjacent materials may also be used for the rod 702 of the channel blank 700. A dense, uniform coating 704 having a suitable composition is formed on the surface of the refractory metal rod 702 by suitable means. This coating will form at least a part of the inner diameter surface of the finished fuel element coolant channel 105 (and hence, is also referred to herein as a channel coating or channel cladding). Suitable compositions are as disclosed herein and include, for example, a tungsten or tungsten-molybdenum coating having a thickness in the range of 50 to 150 µm, alternatively 50 to 100 µm or 50 to 75 µm. Suitable deposition methods include vapor depositions methods, such as chemical vapor deposition (CVD), and electrodeposition processes. It is noted that this coating is intended to remain once the refractory metal rod is removed after consolidation of the fuel element and will form a barrier coating (cladding) on the inner diameter of the finished fuel element coolant channel 105 so that the coolant, such as hot hydrogen ($H_2$) gas, does not interact with the fuel meat in the CERMET fuel element 110. After forming the coating 704, a spacer structure 706 is formed on the outer surface of the coating via suitable means S514. For example, the spacer structure 706 can be applied or formed using any one of extruded, printed (such as screen printed), particle spraying techniques or other suitable means. In some embodiments, the spacer structure comprises ceramic fuel particles and suitable solvents and organic binder(s) to facilitate deposition of rigid, stable structures upon curing/drying the deposited material. The spacer structure may be in the form of multiple straight lines or spirals running axially along the length of the rod. The lines/spirals may be continuous or discontinuous, as long as they provide sufficient interaction with adjacent channel blanks to control the spacing of the channel blanks (which, upon further processing, will correspond to controlling the spacing between the finished fuel element coolant channels 105). It should be noted that using spacer structures that differ in periodicity, location, size, handedness of feature (i.e., right handed vs. left handed) or other feature can minimize or prevent nesting of adjacent channel blanks.

In another embodiment S510b, the channel blank 730 is in the form of a metal tube 732 and the method S516 forms a spacer structure 736 on an outer surface 738 of the channel blank 730. For example, a full-length, thin-wall tube (round cross-section) having a diameter less than final size is used to form the channel blank. The inner diameter of the channel blank is smaller than the inner diameter of the finished fuel element coolant channel 105 because the inner diameter of the channel blank will expand during the subsequent HIP process used to consolidate the plurality of coated fuel particles with the spacer structures to form the CERMET fuel meat. It should be noted that, after the HIP process, the metal tube 732 forming the channel blank 730 will remain in the finished CERMET fuel element to form a single coolant passage and will serve as the channel cladding to protect the ceramic fuel kernels within the CERMET fuel element 110 from the coolant (such as hydrogen) flowing through the fuel element coolant channel 105. The material of the metal tube is a Mo—W alloy, tungsten, or other suitable refractory metal alloy that will expand during the HIP process and is compatible with the fuel and will form a barrier coating on the inner diameter of the finished fuel element coolant channel 105 so that the coolant, such as hot hydrogen ($H_2$) gas, does not interact with the fuel in the CERMET fuel meat. The spacer structure is formed on the outer surface of the channel blank and the formation and characteristics, such as materials, locations and shapes, of the spacer structure 736 formed on the outer surface 738 of the metal tube 732 forming the channel blank 730 in method S516 can be the same as that for the spacer structure 706 formed on an outer surface 708 of the channel coating 704 in method S514.

Subsequent to preparing channel blanks having a plurality of spacer structures on an outer surface, the method S520 assembles a plurality of channel blanks (having a plurality of spacer structures thereon) in spaced-apart relation inside a can assembly for a HIP process.

For example, in one embodiment, the channel blank 700 in the form of a refractory metal rod, a channel coating, and spacer structure is assembled into a fixture, such as an end cap, that establishes the spacing of the fuel element coolant channels 105. This spacing is based on neutronics and, typically, will be nominally uniform (although some variation in spacing may be introduced as a result of the HIP consolidation process). The fixture holding the channel blanks will need to accommodate the reduced spacing as well as potential consolidation induced variation. The fixture will ultimately become part of a can assembly used in the HIP consolidation process. As such, a refractory metal material such as Ta or Mo is typically used to fabricate the bottom fixture.

Also for example, in another embodiment, the channel blank 730 in the form of a refractory metal tube and spacer structure is welded to a bottom end cap containing suitably positioned holes to allow the refractory metal tube to project past the end cap. The projecting portion of the refractory metal tube is then melted during a welding process to join the refractory metal tube to the end cap. Alternatively, the refractory metal tube can be butted to the end cap and sufficiently melted during a welding process to assure joining between refractory metal tube and the end cap, followed by drilling (if necessary) to open a passage into the interior volume of each refractory metal tube (this is, at least in part, to allow for HIP gas to pressurize the inner diameter of the refractory metal tube during the later HIP consolidation process). In this alternative, precise tube lengths are beneficial and can be accomplished by, for example, welding one end of the refractory metal tube to anchor the refractory metal tube to the end cap and then applying a removal process, such as skim cutting or grinding, to the open end of the refractory metal tube so that each has the same length.

The structure that forms the outer structure of the HIP can assembly is then attached to the assembled plurality of channel blanks (having a plurality of spacer structures thereon) to form an unsealed can assembly. For example, a suitable thin-wall cylindrical refractory metal tube can be joined, e.g., welded, to the bottom fixture or to the bottom end cap. This refractory metal (e.g., Ta or Mo) tube will form the outer "can" for the HIP process. As assembled, characteristics of the spacer structures, such as the location, geometry and size, contribute to maintain spacing between the channel blanks and also facilitate filling the "can" with ceramic fuel particles.

The method S500 continues and comprises adding a first plurality of ceramic fuel particles to the void space (formed by the spaced-apart relation, between the plurality of channel blanks) and debinding the spacer structure. The steps of adding the ceramic fuel particles to the void space and debinding the spacer structure can occur in any order. Thus, a first embodiment S530a includes S532 heating the unsealed can assembly under a vacuum to debind the spacer structure followed by S534 adding a plurality of ceramic fuel particles to the void space (formed by the spaced-apart relation, between the plurality of channel blanks). If the vacuum is broken to add the plurality of ceramic fuel particles to the void space in step S534, another cycle of degassing under vacuum would occur. A second embodiment S530b, includes S536 adding a plurality of ceramic fuel particles to the void space (formed by the spaced apart relation, between the plurality of channel blanks) followed by S538 heating the unsealed can assembly under a vacuum to debind the spacer structure. Vacuum can be applied slowly to avoid entrapped gases from entraining powder and/or particles. The process of adding ceramic fuel particles to the void space can be by any suitable means. Typically, the ceramic fuel particles are added to the interior volume formed by the unsealed can assembly and are allowed to flow down into the cavities within the can assembly (including the void spaces between assemble channel blanks). Agitation, automated tapping or other mechanical means can be used to promote the filling and distribution of the fuel particles throughout the interior volume. The process of debinding the spacer structure can be by any suitable means. Typically, either before or after filling the assembly with coated fuel particles, the (empty or filled) unsealed can assembly is placed in a vacuum chamber and heated to remove any organic material used to form the spacer structures so that no residual carbon remains. Also, a final vacuum heat treatment to remove any remaining volatile species can be performed just prior to sealing the HIP can assembly. An example vacuum heat treatment can be at approximately 250° C. to 1200° C., depending on volatile species. Typically, sealing is done while under vacuum to avoid moisture reentering the system.

Suitable methods, such as X-ray inspection, computer vision, weighing systems and combinations thereof, may be used to verify acceptable loading of the fuel particles within the can assembly.

The method S500 continues and the filled and debinded, unsealed can assembly is sealed S540. Sealing the can assembly can be by any suitable means. For example, a top end cap can be joined, such as by welding, to the cylindrical tube that forms the outer wall of the HIP can assembly. Also, where the channel blanks protrude past the wall of the can assembly, each channel blank also will be sealed to the top end cap by suitable means, such as by welding. Typically, only a perimeter seal weld will be required to create a hermetic assembly. Overall, the sealed assembly can be inspected to ensure the sealed assembly is leak tight.

The method S500 continues and comprises consolidating the plurality of spacer structures and ceramic fuel particles to form the CERMET fuel element 110 by HIP processing the sealed can assembly at an elevated temperature and an elevated pressure.

A first embodiment S550a is applicable when the channel blank is in the form of a refractory metal rod having a channel coating formed on an outer surface and a spacer structure formed thereon (as in embodiment S510a). In that case, the sealed assembly can be S560 HIP processed to consolidate the plurality of spacer structures and ceramic fuel particles to form the CERMET fuel element 110.

A second embodiment S550b is applicable when the channel blank is in the form of refractory metal tube and a spacer structure formed thereon (as in embodiment S510b). In that case, prior to HIP processing S560, the sealed assembly is further prepared so that, in addition to HIP pressure being applied to exterior surfaces of the sealed can assembly, HIP pressure is applied to the inner diameter surfaces of the hollow refractory metal tubes during the HIP processing S560. For example, the ends of the refractory metal tubes can be sealed S552, such as by joining an end cap by, e.g., welding, so that they are gas tight, and then S554 a passage is provided for an elevated pressure, typically the HIP pressure in the form of gas pressure, to be applied to the inner diameter surfaces of the refractory metal tubes during the HIP processing S560. The elevated pressure applied to the inner diameter surfaces of the refractory metal tubes functions to prevent HIP pressure applied to the external surfaces of the can assembly from causing inward deformation of the refractory metal tubes during the HIP processing S560. The elevated pressure applied to the inner diameter surfaces of the refractory metal tubes also functions to expand the inner diameter of the refractory metal tubes during the HIP processing S560, which can, for example, assist in consolidating the contents of the can assembly. Once sealed S552 and provided with a passage S554, the sealed assembly can be S560 HIP processed to consolidate the plurality of spacer structures and ceramic fuel particles to form the CERMET fuel element 110.

HIP processing (as in step S560) occurs under processing conditions that are selected so as to produce a relatively dense CERMET fuel element 110 (greater than 95% of theoretical density/less than 5% porosity) and ensure complete bonding between the coating on the refractory metal rods and the matrix phase materials; for example, between the tungsten coating that was applied to the Mo rods and the Mo—W alloy matrix phase, and/or between the metal tube and the matrix phase materials. The relatively dense CERMET fuel element 110 also preferably has a uniform distribution of fuel kernels and residual porosity, both of which contribute to optimized fuel mechanical and thermal properties.

Also, the HIP cycle is tailored to avoid applying gas pressure at temperatures at which the coolant channel tubes (when present) and the outer can wall are not ductile. For example, during the HIP processing, gas pressure should not be applied until the refractory metal materials used for the "can" have adequate ductility and so consolidation of the Mo—W alloy matrix phase will occur without damaging the can or coolant channels. In generally, the HIP temperature and pressures profile squeezes the outer can and expands the internal coolant tubes so as to consolidate the spacer structures and ceramic fuel particles.

Thus, in exemplary embodiments, the HIP process can be separated into a "conditioning" step of the HIP can assembly prior to sealing the HIP can assembly and then a subsequent "consolidation" step. First, with regard to the "conditioning" step, when a material containing organic material (e.g., a binder phase) is present, the organic material is burned out (generally referred to as "debinding") prior to sealing the HIP can assembly. Debinding can be performed under vacuum or using a controlled atmosphere with a relatively low oxygen partial pressure, but with enough oxygen to facilitate removal of carbon. This process is often accomplished by holding the temperature for several hours in the range of 400 to 600° C. After completing the debinding process, the HIP can assembly and its contents can be outgassed in vacuum at temperatures ranging, for example, up to 1200° C., such as 900° C. to 1200° C. Also, the temperature should be selected to avoid recrystallization of any refractory metal alloys used for the can assembly, as recrystallization will result in significantly reducing the ductility of the materials. These example temperatures are appropriate when working with refractory metal materials, but other temperatures can be used based on the materials selected for the HIP can assembly. Once the processes of the "conditioning" step are completed, the HIP can assembly can be sealed.

The HIP consolidation step generally includes heating the HIP can assembly to a temperature in the range of about 40% to 50% of the melting point (or solidus) for the material to be densified. In the case of a Mo-30W alloy, the solidus is approximately 2750° C., in which case the HIP cycle would generally include heating the HIP can assembly at a low pressure (or slight vacuum) to a temperature in the range 1250 to 1375° C. and then applying a high pressure to assist the consolidation process. The pressure used to assist the consolidation process can range from about 17,000 pounds/inch$^2$ (psi) up to about 44,000 psi (approx. 120 MPa to 300 MPa). The optimal pressure range, along with the peak temperature and dwell time, can be further determined empirically.

An example of a suitable HIP profile incudes an initial 1 hour ramp up to outgas the can assembly out (approx. 1000° C.) at low pressure (approx. 10-4 torr/0.013 Pa), holding temperature and pressure at the outgas condition for 1 hour, followed by a second ramp up in temperature to the desired consolidation temperature before adding pressure to complete consolidation. Depending on materials, other suitable HIP profiles may be used.

In exemplary embodiments, the HIP process uniformly consolidates the spacer structures with the ceramic fuel particles such that no significant voids or dissimilar materials are present in the as-HIP'ed assembly and there is a heat conduction path between fuel, matrix material and cladding material to provide a heat removal path consistent with the neutronics profile of the reactor.

The as-HIP'ed assembly undergoes a finish process S580 before the fuel element 110 is incorporated into a fuel assembly 100 used in a NTP reactor, i.e., sized and connected to the appropriate upstream and downstream components. The finish process S580 achieves the desired surface finish and size of the inner diameter of the fuel element coolant channels 105 before such incorporation. Example finish processes include grit blasting or pulling a broach through the channels.

In the case where the channel blank is in the form of a metal rod, the as-HIP'ed assembly undergoes additional processing S570 to remove the metal rod of the channel blank while leaving in place the channel coating. This additional processing creates an opening (which will become the fuel element coolant channel 105) from a first longitudinal end of the metal rod to a second longitudinal end of the metal rod. The opening can be formed by, for example, removing the metal rod by pickling or ECM, or a combination thereof. Such processing removes the material of the metal rod, such as Mo, while leaving behind the material of the coating, such as tungsten. The material that remains after this removal process forms the structure for the inner diameter of the fuel element coolant channel 105 and functions as cladding to provide a barrier between the coolant and the CERMET fuel meat. A finish process S580 achieves the desired surface finish and size of the inner diameter of the fuel element coolant channels 105. Example finish processes include grit blasting or pulling a broach through the channels.

In both instances, further processing S590 occurs to prepare the as-HIP'ed CERMET fuel element 110 to be incorporated into the CERMET fuel assembly 100 (including the fuel assembly outer structure 115 and insulation layer 160). Further processing S590 can include removing the material of the outer "can" of the can assembly (and the material of any "caps" on the metal tube, if present) and adding an external cladding.

Removing the material of the outer "can" of the can assembly (and the material of any "caps" on the metal tube, if present) can be by suitable processes. Examples of suitable can removal processes include mechanical methods, such as cutting, machining or grinding, and chemical methods, such as etching or dissolving. If required, it may also be necessary to remove CERMET material that was in direct contact with the can. For example, if there is a concern about diffusion of material from the can alloy into the surface of the CERMET meat, one can remove a thin layer of the outer surface of the CERMET meat prior to adding a suitable external cladding via CVD or other suitable process.

After removal of the outer can and end caps and subsequent to any additional machining/cleaning operations, an external cladding is added to the HIP'ed CERMET fuel element 110. This external cladding serves as a protective coating. The desired cladding can be applied to the external surfaces of the CERMET fuel element 110, typically via CVD. Cleaning out the coolant channels (as described with reference to steps S580 and S680) may be performed prior to deposition of the external coating. Once the CERMET fuel element 110 (or elements) has been properly loaded into the fuel assembly 100, as depicted for example in FIG. 2, then the fuel assembly 100 is ready to be inserted into appropriate locations within the moderator block 200.

In another example of further processing S590, a dense Mo—W alloy or W coating can be applied to the outer surface of the CERMET fuel element 100 via a suitable deposition process, such as CVD. The thickness of this external coating is typically in the range of 25 to 100 μm, alternatively 50 to 100 μm or 75 to 100 μm.

As an alternative to forming spacer structures by adding material to the outer surface of the channel blank, the spacer structure can be formed from the material of the channel blank itself and the (channel blank+spacer structure) are a unitary body. Such unitary bodies can be formed by suitable metallurgy processing techniques, such as drawing, pilgering, plug rolling/milling, and piercing, and with or without rotation. This process is most relevant to embodiments in which metal tubes form the channel blank and are subsequently expanded into a suitable circular cross section during HIP processing to create the fuel element coolant channels 105.

Figure 6A:
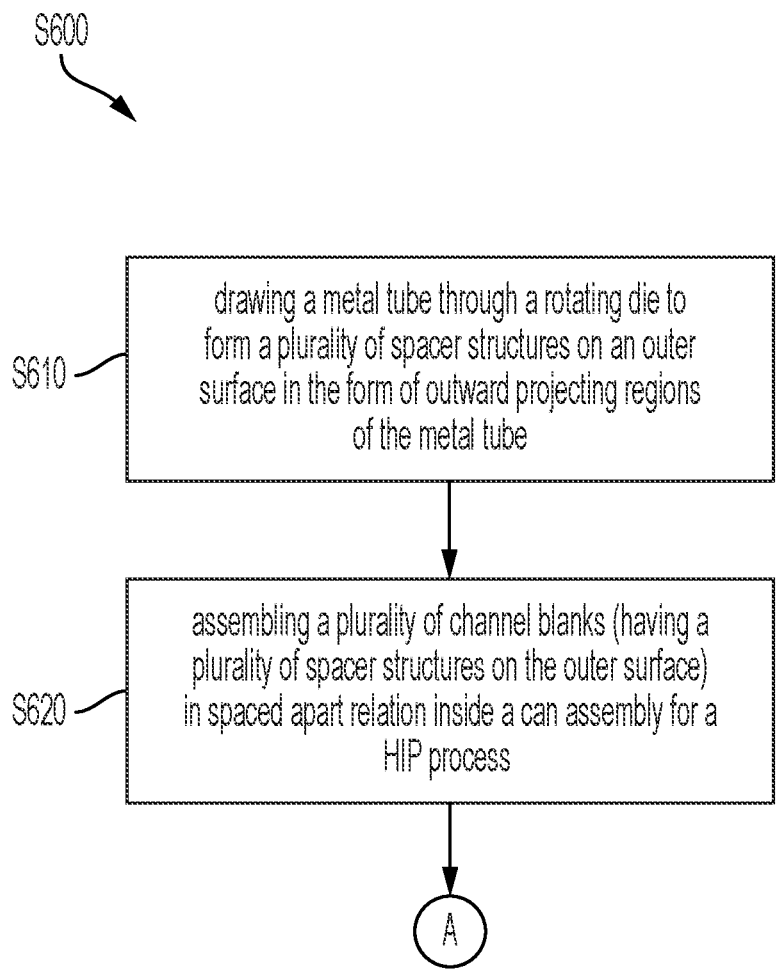
FIGS. 6A to 6C is a flow diagram setting forth various steps in another embodiment of a method of manufacturing a CERMET fuel element.
Figure 6B:
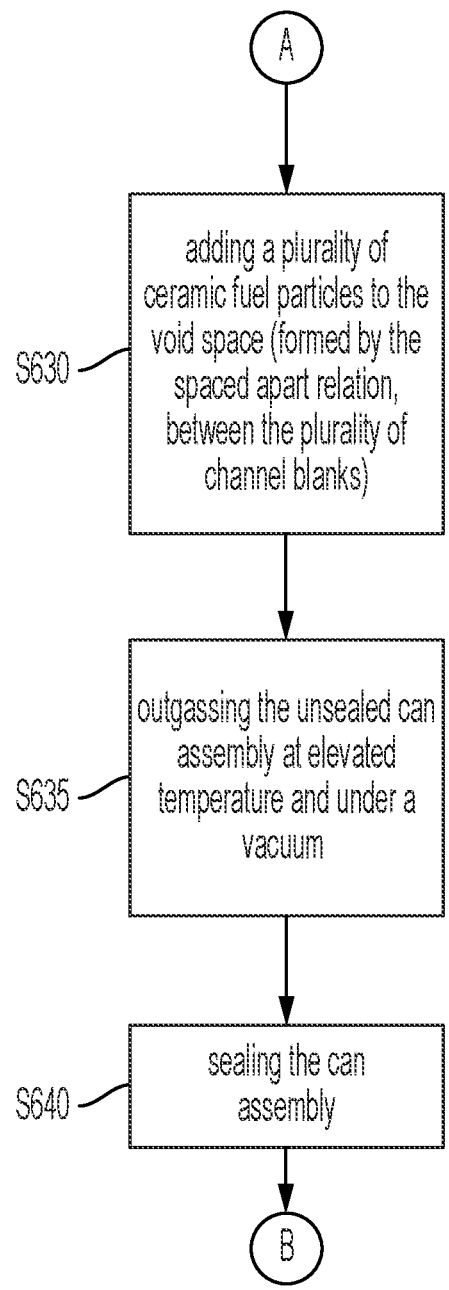
Figure 6C:
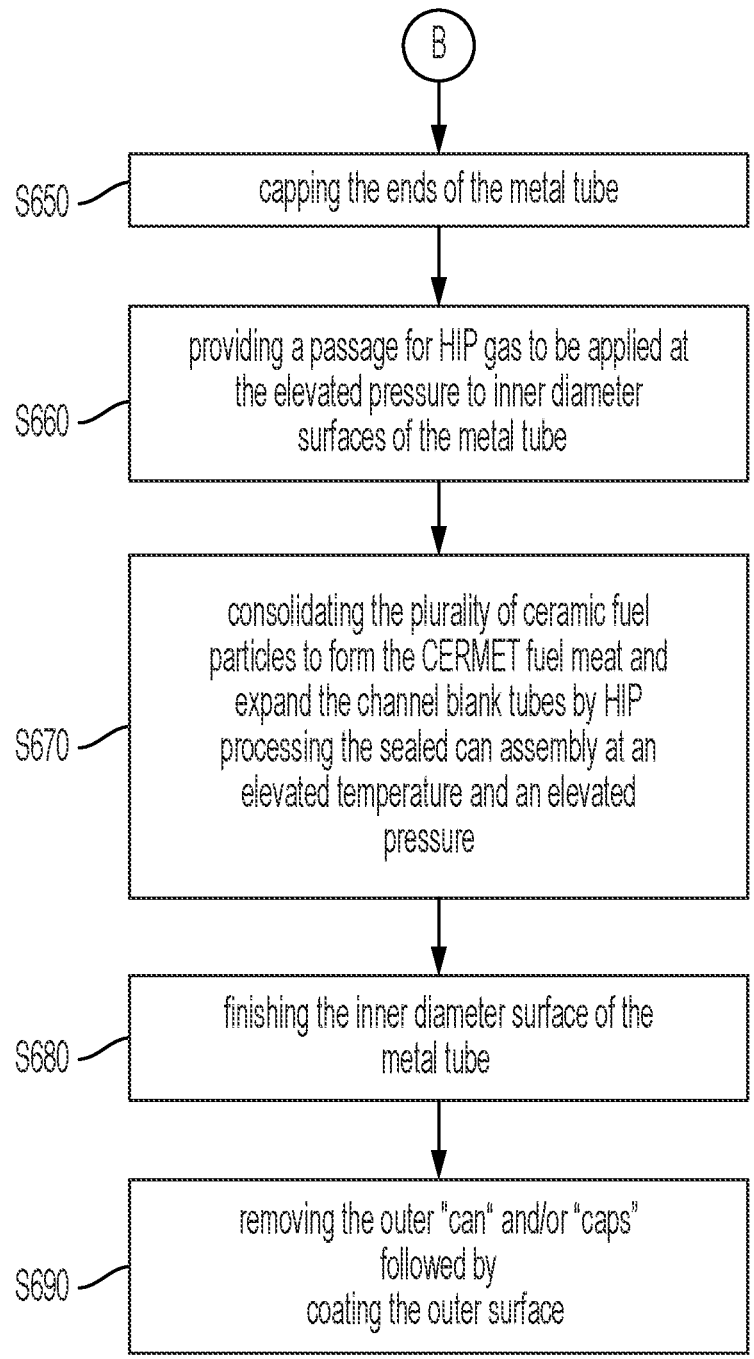

An example of this processing method S600 is illustrated in FIGS. 6A to 6C, which is based on preparing the channel blanks in the form of a metal tube by drawing through a rotating die with a synchronously rotating mandrel supporting the inner diameter of the metal tube S610. In this example, the drawing produces undulations longitudinally along the tube wall and rotation creates a spiral of outward projecting regions (projecting relative to the base outer surface) or raised ridges. Contact between the "waves" of the undulations in the tube wall on adjacent tubes provide spacing between the respective adjacent tubes. In one aspect, tubes with undulations around their circumference permit arranging these future coolant channel tubes close together, but spaced apart in the fuel meat.

After manufacturing the channel blank as a unitary body with the spacer structure, subsequent processing steps in method S600 are substantially the same as those illustrated and disclosed in connection with method S500 and FIGS. 5A to 5D for the embodiment where the channel blank is in the form of a metal tube, see, e.g., steps S520, S534/S536, S540, S550b, S560, S580, and S590, and the disclosure related to relevant steps in method S500 can be applied and/or adapted to the corresponding steps in method S600.

More specifically, the plurality of channel blanks are S620 assembled in spaced-apart relation inside a can assembly for a HIP process. The outward projecting regions/raised ridges function as the spacer structure with the spacer structure on a first channel blank being in contact with the spacer structure on a second, adjacent channel blank, which provides a defined distance for the spacing of the assembled channel blanks and forms a void space between the channel blanks, e.g., the void space being the negative space between the assembled channel blanks. Components that will form the CERMET fuel meat, e.g., a plurality of ceramic fuel particles, of a CERMET fuel element 110 are S630 added to the void space. Once the contents of the can assembly are in place and prior to sealing S640, the unsealed can assembly is S635 outgassed at elevated temperatures, such as 1000° C., under a vacuum. After outgassing the can assembly is sealed S640 and (as necessary) the metal tube capped S650, and a passage for gas pressure provided S660. Once sealed (and provided with a passage), the sealed assembly can be S670 HIP processed to consolidate the plurality of ceramic fuel particles and expand the channel blank tubes to form the CERMET fuel element 110.

The as-HIP'ed assembly undergoes a finish process S680 before being be incorporated into a fuel assembly 100 used in a NTP reactor, i.e., sized and connected to the appropriate upstream and downstream components. The finish process S680 achieves the desired surface finish and size of the inner diameter of the fuel element coolant channels 105 before such incorporation. Example finish processes include grit blasting or pulling a broach through the channels. The outer can and/or caps are then removed and the outer surface coated S690, as previously disclosed.

Figure 7A:
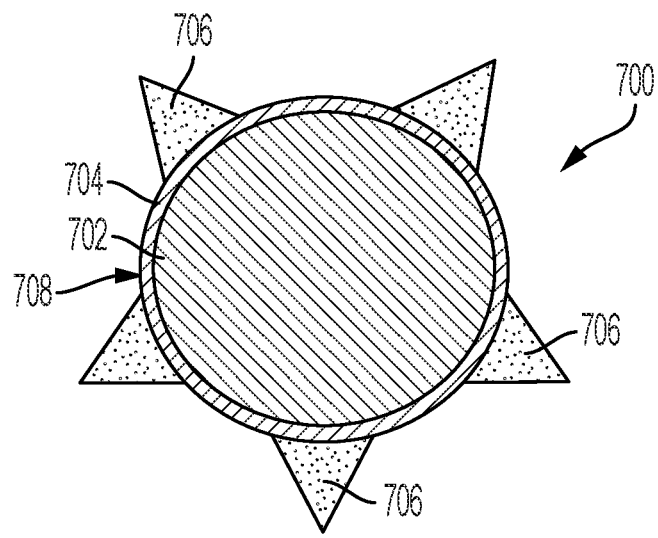
FIGS. 7A and 7B schematically illustrate embodiments of the channel blank that can be used in manufacturing a CERMET fuel element.
Figure 7B:
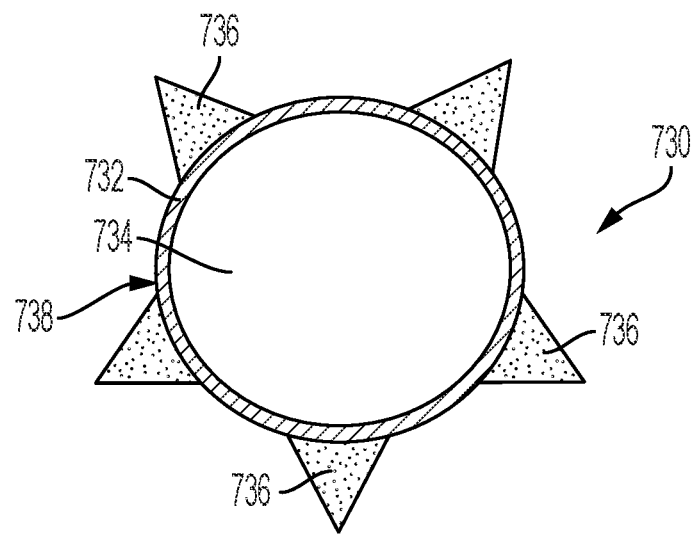

FIGS. 7A and 7B schematically illustrate (in cross-sectional view) embodiments of the channel blank that can be used in manufacturing a fuel element.

The embodiment schematically illustrated in FIG. 7A is based on forming a channel coating on an outer surface of the channel blank (the channel blank beginning in the form of a metal rod) and forming a spacer structure on an outer surface of the channel coating. Thus, the channel blank 700 includes a metal rod 702, a channel coating 704, and a plurality of spacer structures 706. In the illustrated example, the plurality of spacer structures 706 are in the shape of triangles, but other shapes (as well as sizes) can be used as disclosed herein. Also, in the illustrated example, there are five spacer structures 706 that are distributed equidistantly about the circumference 708 of the channel blank 700, but other numbers and distributions (locations and periodicities) can be used as disclosed herein.

The embodiment schematically illustrated in FIG. 7B is based on forming a spacer structure on an outer surface of the channel blank (the channel blanks begin in the form of a metal tube). Thus, the channel blank 730 includes a metal tube 732 with an internal volume 734, and a plurality of spacer structures 736. In the illustrated example, the plural-ity of spacer structures 736 are in the shape of triangles, but other shapes (as well as sizes) can be used as disclosed herein. Also, in the illustrated example, there are five spacer structures 736 that are distributed equidistantly about the circumference 738 of the channel blank 730, but other numbers and distributions (locations and periodicities) can be used as disclosed herein.

Various arrangements and shapes for the spacer structures are contemplated. Such variety can be in relation to number, periodicity, location, size, handedness of feature (i.e., right handed vs. left handed) or other feature(s) that provides a defined distance for the spacing of the assembled channel blanks and forms a void space between the channel blanks and can minimize or prevent nesting of adjacent channel blanks. Certain variations may be more suitable for or may provide advantages during a given process for forming the spacer structures.

Figure 8A:
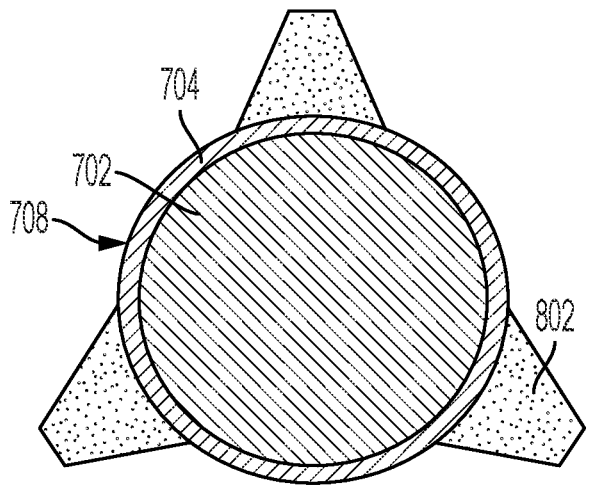
FIGS. 8A to 8C schematically illustrate various embodiments of exemplary spacer structures on a channel blank.
Figure 8B:
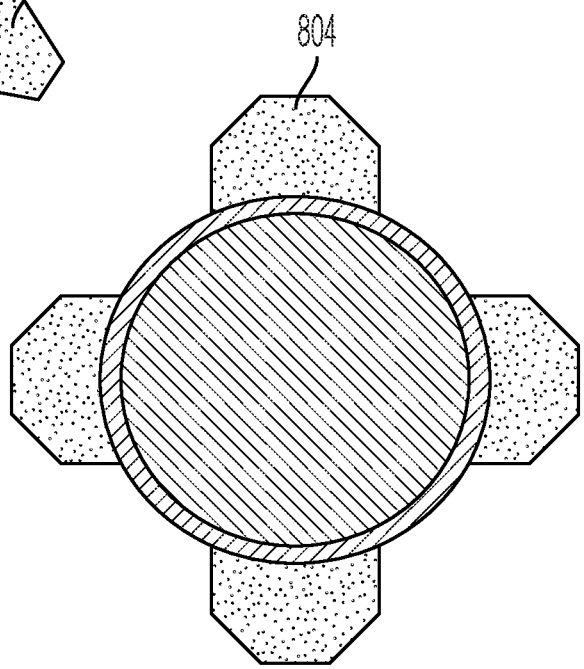
Figure 8C:
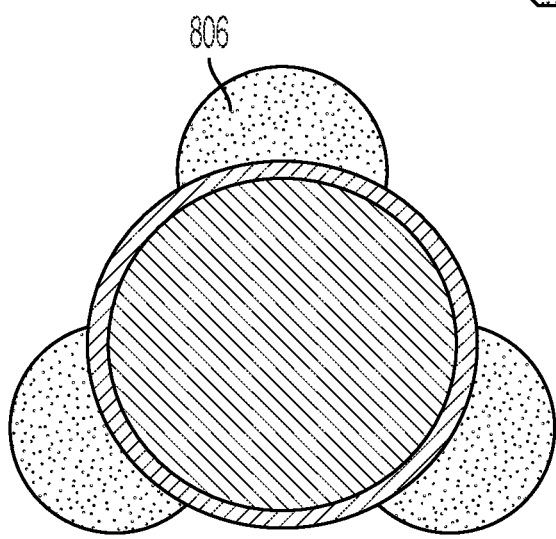

FIGS. 8A to 8C schematically illustrate various example embodiments of spacer structures on a channel blank. The example embodiments include truncated triangles or trapezoidal shapes 802 in FIG. 8A, beveled quadrilaterals 804 in FIG. 8B, and hemispheres 806 in FIG. 8C. Alternative geometric shapes can be used, such as alternative quadrilateral, hexagonal, octagonal, decahedral and spherical and semi-spherical shapes. Additionally, different numbers of support structures are shown, including three (FIGS. 8A and 8C) and four (FIG. 8B) support structures. In FIGS. 8A to 8C, a channel blank in the form of a metal rod is used for illustrative purposes only, and any disclosed form of the channel blank can be suitably used.

Figure 9:
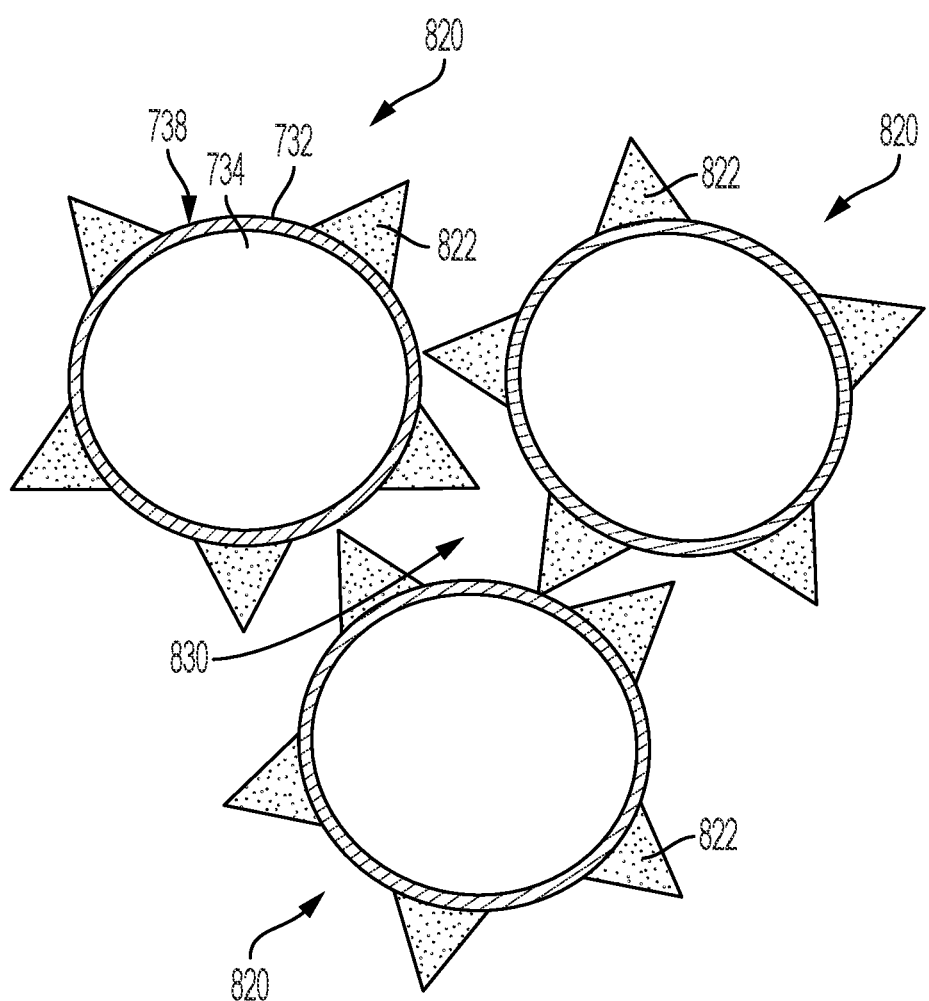
FIG. 9 schematically illustrates a plurality of channel blanks with first example embodiments of spacer structures and an example spaced-apart relationship.

FIG. 9 schematically illustrates a plurality of channel blanks with first example embodiments of spacer structures and an example spaced-apart relationship. Each channel blank 820 includes a metal tube 732 with an internal volume 734, and a plurality of spacer structures 822. In the illustrated example, the three channel blanks 820 are in spaced-apart relationship, in which the plurality of spacer structures 822 prevent the channel blanks 820 from being closer to each other, and with a void space 830 between the channel blanks 820, e.g., the void space being the negative space between the assembled channel blanks 820. With uniformly sized spacer structures 822, the channel blanks 820 are in substantially uniformly spaced relation.

Figure 10:
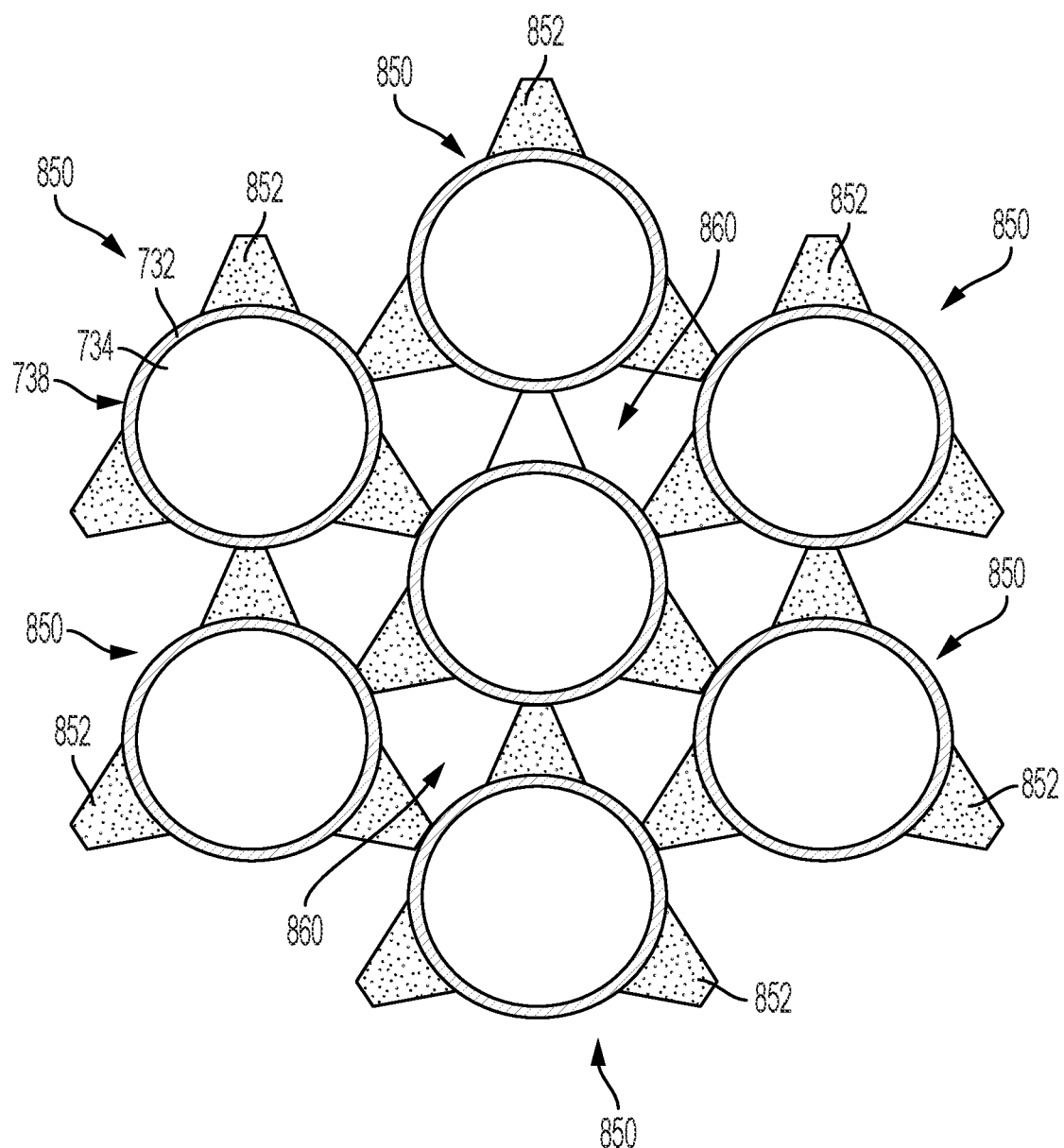
FIG. 10 illustrates a plurality of channel blanks with second example embodiments of spacer structures and another example spaced-apart relationship.

FIG. 10 illustrates a plurality of channel blanks with second example embodiments of spacer structures and another example spaced-apart relationship. Each channel blank 850 includes a metal tube 732 with an internal volume 734, and a plurality of spacer structures 852. In the illustrated example, the channel blanks 850 are in spaced-apart relationship, in which the plurality of spacer structures 852 prevent the channel blanks 850 from being closer to each other, and with a void space 860 between the channel blanks 850, e.g., the void space being the negative space between the assembled channel blanks 850. With uniformly sized spacer structures 852, the channel blanks 850 are in substantially uniformly spaced relation.

In FIGS. 9 to 10, a channel blank in the form of a metal tube is used for illustrative purposes only, and any disclosed form of the channel blank can be suitably used. Additionally, the embodiments of the spacer structures on the channel blank are for illustrative purposes only, and any disclosed form of the spacer structures can be suitably used.

The disclosure is also directed to a nuclear thermal propulsion engine that includes the nuclear propulsion fission reactor structure. The nuclear propulsion fission reactor structure may be located within a vessel. The nuclear thermal propulsion engine further includes shielding, turbo machinery, and a nozzle section, each of which may optional be attached to or supported by the vessel. A reservoir for cryogenically storing a propulsion gas is operatively connected, along with the shielding and turbo machinery, to provide a flow path from the reservoir to the nuclear propulsion reactor and the nozzle section is operatively connected to provide a flow path for superheated propulsion gas exiting the nuclear propulsion reactor.

As used herein, channel cladding is the layer of the finished CERMET fuel element containing features that are located between the coolant and the CERMET fuel meat. The channel cladding functions to prevent hydrogen from gaining access to and reacting with the fuel kernels. In addition, the cladding functions as a safety barrier that prevents radioactive fission fragments from escaping the fuel into the coolant and contaminating it. Some design constraints of cladding include neutron absorption, radiation resistance and temperature behavior. Example materials include Mo—W alloys, tungsten, although other materials may be used if suitable to the reactor conditions. In some embodiments, the cladding material can be isotope enriched to enhance reactivity through reduction of isotopes with higher neutron absorption cross-sections, e.g., molybdenum enriched Mo-92 will have a less parasitic neutron absorption cross-section than natural molybdenum. Another example is W enrichment with W-184.

It is contemplated that various supporting and ancillary equipment can be incorporated into the disclosed nuclear propulsion fission reactor structure and nuclear thermal propulsion engine. For example, at least one of a moderator (such as a zirconium hydride (ZrH), beryllium (Be), beryllium oxide (BeO), and graphite), a control rod (such as iridium control rod) for launch safety, and a scientific instrument (such as a temperature sensor or radiation detector) can be incorporated into the nuclear propulsion fission reactor structure.

The disclosed arrangements pertain to any configuration in which a heat generating source including a fissionable nuclear fuel composition, whether a fuel element or the fissionable nuclear fuel composition per se, is incorporated into a fuel assembly. Although generally described herein in connection with a gas-cooled nuclear thermal propulsion reactors (NTP reactors), the structures and methods disclosed herein can also be applicable to other fission reactor systems.

Nuclear propulsion fission reactor structure disclosed herein can be used in suitable applications including, but not limited to, non-terrestrial power applications, space power, space propulsion, and naval applications, including submersibles.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A method of manufacturing a CERMET fuel element including a CERMET fuel meat and a plurality of fuel element coolant channels, comprising:
    assembling a plurality of channel blanks in spaced-apart relation inside a can assembly, wherein assembling includes attaching a first end of each channel blank to a fixture of the can assembly and forming, by the spaced-apart relation, a void space between the plurality of channel blanks, and wherein an outer surface of each channel blank includes a plurality of spacer structures and each of the plurality of spacer structures is sized to provide uniform separation distance between each channel blank;
    adding a first plurality of ceramic fuel particles to the void space;
    sealing the can assembly; and
    consolidating the first plurality of ceramic fuel particles to form the CERMET fuel meat,
    wherein the first plurality of ceramic fuel particles have a composition including high-assay low-enriched uranium (HALEU) with U-235 assay above 5 percent and below 20 percent and a fuel particle coating containing tungsten or containing molybdenum and tungsten, and
    wherein a diameter of each of the plurality of channel blanks prior to consolidating is equal to or is smaller than a final diameter of the fuel element coolant channels in the CERMET fuel element.

2. The method according to claim 1, wherein consolidating includes processing the sealed can assembly by hot-isostatic pressing (HIP) at a temperature of 1250° C. to 1700° C. and a pressure of 120 MPa to 300 MPa.

3. The method according to claim 1, wherein the plurality of spacer structures are in the form of multiple straight lines or spirals running continuously axially along a length of each channel blank.

4. The method according to claim 1, wherein the plurality of spacer structures are in the form of multiple straight lines or spirals running discontinuously axially along a length of each channel blank.

5. The method according to claim 1, wherein the plurality of spacer structures on adjacent channel blanks of the plurality of channel blanks differ in periodicity, location, size, or handedness.

6. The method according to claim 1, wherein each of the channel blanks is a refractory metal rod, and the method further comprises:
    before assembling the plurality of channel blanks in spaced-apart relation inside the can assembly, (a) forming a channel coating on a surface of each of the refractory metal rods, the channel coating having a composition including tungsten, molybdenum, or combinations thereof, and (b) forming the plurality of spacer structures on a surface of each of the channel coatings, the plurality of spacer structures including a second plurality of ceramic fuel particles and an organic binder;
    after assembling the plurality of channel blanks in spaced-apart relation inside the can assembly and before sealing the can assembly, heating the unsealed can assembly under a vacuum to debind the plurality of spacer structures; and
    after forming the CERMET fuel meat, removing the refractory metal rods of the channel blanks while leaving in place the channel coatings,
    wherein the second plurality of ceramic fuel particles have a composition including high-assay low-enriched uranium (HALEU) with U-235 assay above 5 percent and below 20 percent and a fuel particle coating containing tungsten or containing molybdenum and tungsten, and
    wherein, after forming, the CERMET fuel meat includes the first plurality of ceramic fuel particles and the second plurality of ceramic fuel particles.

7. The method according to claim 6, wherein each of the plurality of spacer structures has a shape of a truncated triangle or of a truncated trapezoid.

8. The method according to claim 6, further comprising, after forming the CERMET fuel meat, removing the can assembly to expose a surface of the CERMET fuel element.

9. The method according to claim 8, further comprising applying a coating to the exposed surface of the CERMET fuel element, wherein the coating has a composition including tungsten, molybdenum, or combinations thereof.

10. The method according to claim 9, wherein a thickness of the coating applied to the exposed surface of the CERMET fuel element is 25 microns to 100 microns.

11. The method according to claim 1, wherein each of the channel blanks is a metal tube, and wherein the diameter of each of the plurality of channel blanks that is equal to or smaller than the final diameter of the fuel element coolant channels prior to consolidating is an inner diameter of each of the metal tubes, and the method further comprises:
- before assembling the plurality of channel blanks in spaced-apart relation inside the can assembly, forming the plurality of spacer structures on an outer diameter surface of each of the metal tubes, the plurality of spacer structures including a second plurality of ceramic fuel particles and an organic binder;
- after assembling the plurality of channel blanks in spaced-apart relation inside the can assembly and before sealing the can assembly, heating the unsealed can assembly under a vacuum to debind the plurality of spacer structures; and
- before consolidating, capping ends of each of the metal tubes and providing a passage for a gas to be applied at a pressure of 120 MPa to 300 MPa to an inner diameter surface of each of the metal tubes,
- wherein the second plurality of ceramic fuel particles have a composition including high-assay low-enriched uranium (HALEU) with U-235 assay above 5 percent and below 20 percent and a fuel particle coating containing tungsten or containing molybdenum and tungsten,
- wherein consolidating includes applying the pressure to the inner diameter surface of each of the metal tubes, and
- wherein, after forming, the CERMET fuel meat includes the first plurality of ceramic fuel particles and the second plurality of ceramic fuel particles.

12. The method according to claim 11, further comprising, after consolidating, removing the can assembly to expose a surface of the CERMET fuel element.

13. The method according to claim 12, further comprising applying a coating to the exposed surface of the CERMET fuel element, wherein the coating has a composition including tungsten, molybdenum, or combinations thereof.

14. The method according to claim 13, wherein a thickness of the coating applied to the exposed surface of the CERMET fuel element is 25 microns to 100 microns.

15. The method according to claim 1, wherein each of the channel blanks is a metal tube, and wherein the diameter of each of the plurality of channel blanks that is equal to or smaller than the final diameter of the fuel element coolant channels prior to consolidating is an inner diameter of each of the metal tubes, and the method further comprises:
- before assembling the plurality of channel blanks in spaced-apart relation inside the can assembly, forming the plurality of spacer structures on an outer diameter surface of each of the metal tubes, wherein each of the plurality of spacer structures is formed from a portion of a respective metal tube;
- after assembling the plurality of channel blanks in spaced-apart relation inside the can assembly and before sealing the can assembly, heating the unsealed can assembly under a vacuum; and
- before consolidating, capping ends of each of the metal tubes and providing a passage for hot-isostatic pressing (HIP) gas to be applied at a pressure of 120 MPa to 300 MPa to an inner diameter surface of each of the metal tubes,
- wherein consolidating includes applying the pressure to the inner diameter surface of each of the metal tubes, and
- wherein the CERMET fuel meat includes the first plurality of ceramic fuel particles.

16. The method according to claim 15, further comprising, after consolidating the first plurality of ceramic fuel particles, removing the can assembly to expose a surface of the CERMET fuel element.

17. The method according to claim 16, further comprising applying a coating to the exposed surface of the CERMET fuel element, wherein the coating has a composition including tungsten, molybdenum, or combinations thereof.

18. The method according to claim 17, wherein a thickness of the coating applied to the exposed surface of the CERMET fuel element is 25 microns to 100 microns.

* * * * *